United States Patent
Lee et al.

(10) Patent No.: US 11,036,954 B2
(45) Date of Patent: Jun. 15, 2021

(54) ELECTRONIC DEVICE AND FINGERPRINT AUTHENTICATION INTERFACE METHOD THEREOF

(71) Applicant: SAMSUNG ELECTRONICS CO., LTD., Suwon-si (KR)

(72) Inventors: Jongmoo Lee, Suwon-si (KR); Sunhee Moon, Suwon-si (KR); Saerom Lee, Suwon-si (KR); Hyesoon Jeong, Suwon-si (KR); Eunyeung Lee, Suwon-si (KR); Jiwoo Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/285,445

(22) Filed: Feb. 26, 2019

(65) Prior Publication Data
US 2019/0266374 A1    Aug. 29, 2019

(30) Foreign Application Priority Data
Feb. 27, 2018    (KR) .................. 10-2018-0023507

(51) Int. Cl.
*G06F 3/048*    (2013.01)
*G06K 9/00*    (2006.01)
(Continued)

(52) U.S. Cl.
CPC .......... *G06K 9/0002* (2013.01); *G06F 3/017* (2013.01); *G06F 3/0488* (2013.01); *G06F 21/32* (2013.01); *G06K 9/00087* (2013.01)

(58) Field of Classification Search
CPC ........ G06F 21/32; G06F 3/0412; G06F 21/31; G06F 21/62; G06F 3/0416;
(Continued)

(56) References Cited

U.S. PATENT DOCUMENTS 9,043,900 B1    5/2015 Kim et al.
9,887,949 B2    2/2018 Shepherd et al.
(Continued)

FOREIGN PATENT DOCUMENTS

CN    107688734 A    2/2018
JP    2017-517072    6/2017
(Continued)

OTHER PUBLICATIONS

International Search Report dated Jun. 21, 2019 in counterpart International Patent Application No. PCT/KR2019/002312.
(Continued)

*Primary Examiner* — Linh K Pham
(74) *Attorney, Agent, or Firm* — Nixon & Vanderhye P.C.

(57) ABSTRACT

The disclosed electronic device may include a front plate and a rear plate, a touch screen display exposed through a part of the front plate, a fingerprint sensor disposed to overlap a region of the display when viewed from above the front plate, a processor operatively connected to the display and the fingerprint sensor, and a memory operatively connected to the processor. the memory may store instructions that, when executed by the processor, control the electronic device to display a user interface including a first object at a first location of the display, to obtain a gesture input to drag the first object from the first location to the region, to move the first object to the region depending on the gesture input, and to perform authentication using the fingerprint sensor based on the finger being located on the region.

8 Claims, 19 Drawing Sheets

(51) Int. Cl.
  *G06F 3/0488* (2013.01)
  *G06F 3/01* (2006.01)
  *G06F 21/32* (2013.01)

(58) Field of Classification Search
  CPC .... G06F 21/6245; G06F 3/038; G06F 3/0487;
    G06F 9/44521; G06F 3/0488; G06F
    3/04842; G06F 3/0486; G06K 9/0002;
    G06K 9/00087; G06K 9/22
  See application file for complete search history.

(56) References Cited

U.S. PATENT DOCUMENTS

| | | | |
|---|---|---|---|
| 9,946,861 B2 | 4/2018 | Yoon et al. | |
| 9,998,589 B2* | 6/2018 | Miura | H04M 1/72466 |
| 10,262,184 B2 | 4/2019 | Roh et al. | |
| 10,771,422 B2* | 9/2020 | Shepherd | G06F 3/0482 |
| 2013/0139107 A1* | 5/2013 | Jung | G06F 3/0482 |
| | | | 715/810 |
| 2013/0346882 A1* | 12/2013 | Shiplacoff | G06F 3/04842 |
| | | | 715/753 |
| 2014/0359757 A1 | 12/2014 | Sezan et al. | |
| 2015/0004945 A1* | 1/2015 | Steeves | H04L 51/24 |
| | | | 455/412.2 |
| 2015/0169159 A1* | 6/2015 | Yang | H04L 67/26 |
| | | | 715/808 |
| 2015/0220767 A1* | 8/2015 | Yoon | G06K 9/00006 |
| | | | 382/124 |
| 2015/0312765 A1* | 10/2015 | Nade | H04M 1/67 |
| | | | 455/411 |
| 2015/0350147 A1 | 12/2015 | Shepherd et al. | |
| 2015/0363632 A1* | 12/2015 | Ahn | G06F 3/04166 |
| | | | 382/124 |
| 2015/0371073 A1 | 12/2015 | Cho et al. | |
| 2016/0042166 A1* | 2/2016 | Kang | G06F 21/32 |
| | | | 726/7 |
| 2016/0299556 A1* | 10/2016 | Jueng | G06F 3/0487 |
| 2016/0371691 A1* | 12/2016 | Kang | G06Q 20/352 |
| 2017/0046024 A1* | 2/2017 | Dascola | G06F 3/0485 |
| 2017/0109011 A1* | 4/2017 | Jiang | G10L 15/22 |
| 2017/0109727 A1* | 4/2017 | Han | G06Q 20/40145 |
| 2017/0185991 A1* | 6/2017 | Park | H04W 4/023 |
| 2017/0316250 A1 | 11/2017 | Roh et al. | |
| 2018/0063309 A1* | 3/2018 | Mizumoto | H04M 1/67 |
| 2018/0131657 A1* | 5/2018 | Shepherd | G06F 3/0488 |
| 2018/0173923 A1* | 6/2018 | Lee | G06K 9/0002 |
| 2018/0284892 A1* | 10/2018 | Kwon | G06F 3/016 |
| 2018/0365477 A1 | 12/2018 | Seol et al. | |
| 2019/0266374 A1* | 8/2019 | Lee | G06F 3/167 |

FOREIGN PATENT DOCUMENTS

| | | |
|---|---|---|
| KR | 10-2011-0005937 | 1/2011 |
| KR | 10-2015-0092480 | 8/2015 |
| KR | 10-2015-0092964 | 8/2015 |
| KR | 10-2017-0089661 | 8/2017 |
| KR | 10-2017-0122386 | 11/2017 |
| WO | 2017/073811 | 5/2017 |

OTHER PUBLICATIONS

Extended European Search Report dated Jan. 25, 2021 for EP Application No. 19759915.2.

* cited by examiner

ELECTRONIC DEVICE AND FINGERPRINT AUTHENTICATION INTERFACE METHOD THEREOF

CROSS-REFERENCE TO RELATED APPLICATION

This application is based on and claims priority under 35 U.S.C. § 119 to Korean Patent Application No. 10-2018-0023507, filed on Feb. 27, 2018, in the Korean Intellectual Property Office, the disclosure of which is incorporated by reference herein its entirety.

BACKGROUND

1. Field

The disclosure relates to a message providing function of a security application.

2. Description of Related Art

A conventional electronic device requires unlocking and an app execution procedure, for the purpose of displaying summary information (e.g., a part of a message) of a received message through a notification window and identifying detailed information of the corresponding message. When an app is a security-enabled app, the conventional electronic device may output detailed information of the message by performing security authentication (e.g., fingerprint authentication or password input) while the app is executed.

An electronic device may be equipped with a fingerprint sensor. However, because a fingerprint sensor is disposed on the rear surface of the electronic device in a conventional electronic device equipped with a fingerprint sensor, it may be difficult to perform a one-hand operation in the fingerprint authentication process for identifying the received message.

Because a user may identify the content of the received security message after a procedure of unlocking the electronic device, executing an app associated with the security message, and disabling the security of the app is completed, it may be inconvenient for a user to access a security message.

The above information is presented as background information only to assist with an understanding of the disclosure. No determination has been made, and no assertion is made, as to whether any of the above might be applicable as prior art with regard to the disclosure.

SUMMARY

Embodiments of the disclosure address at least the above-mentioned problems and/or disadvantages and provide at least the advantages described below. Accordingly, an example aspect of the disclosure is to provide an electronic device capable of improving the convenience of the user interface during fingerprint authentication, and a fingerprint authentication interface method thereof.

In accordance with an example aspect of the disclosure, an electronic device may include a housing including a front plate facing a first direction and a rear plate facing a direction opposite the first direction, a touch screen display exposed through a part of the front plate, a fingerprint sensor interposed between the display and the rear plate and disposed to overlap a region of the display when viewed from above the front plate, a processor operatively connected to the display and the fingerprint sensor, and a memory operatively connected to the processor. The memory may store instructions that, when executed, cause the processor to control the electronic device to display a user interface including a first object at a first location of the display, to receive a gesture input to drag the first object from the first location to the region, to move the first object to the region depending on the gesture input, and based on a finger being located on the region, to perform authentication using the fingerprint sensor.

In accordance with another example aspect of the disclosure, a fingerprint authentication interface method may include displaying a notification window including a first object at a first location of a display, receiving a gesture input to drag the first object by a finger of a user from the first location to a fingerprint sensing region through the display, identifying a distance between the finger and the fingerprint sensing region depending on the gesture input, and, when the identified distance is within a specified distance, displaying a second object for inducing fingerprint authentication for the first object, in the fingerprint sensing region.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following detailed description, taken in conjunction with the accompanying drawings, in which.

DETAILED DESCRIPTION

Hereinafter, various example embodiments of the disclosure will be described with reference to accompanying drawings. However, those of ordinary skill in the art will recognize that various modifications, equivalents, and/or alternatives on various example embodiments described herein can be variously made without departing from the scope and spirit of the disclosure.

Figure 1:
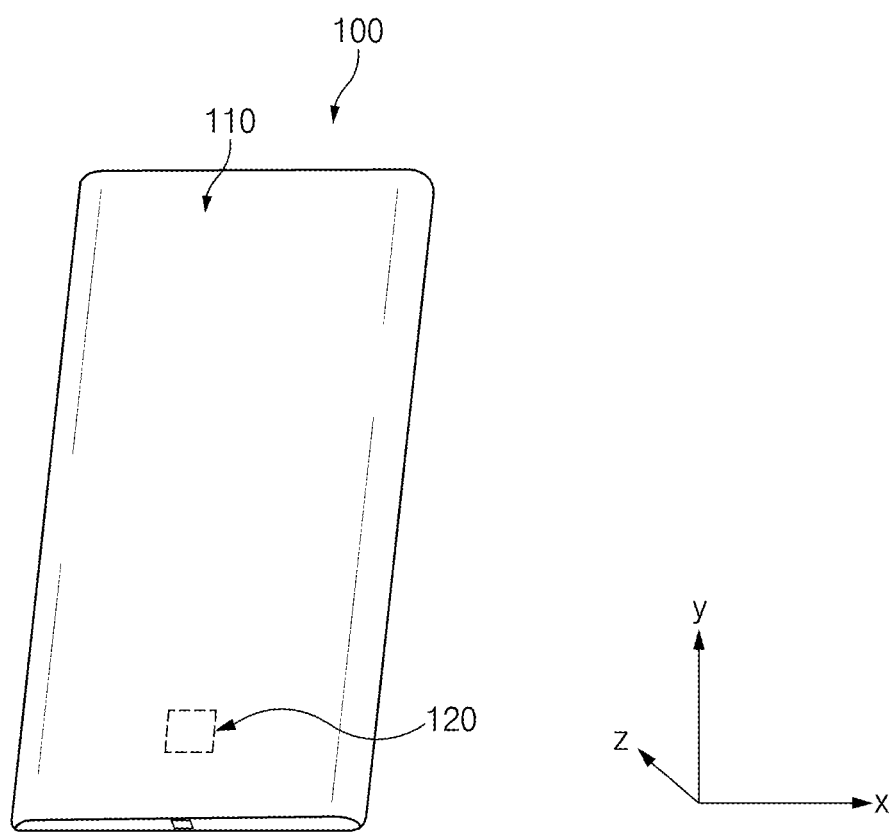
FIG. 1 is a diagram illustrating an exterior appearance of an example electronic device supporting a fingerprint authentication function, according to an embodiment.

FIG. 1 is a diagram illustrating an exterior appearance of an example electronic device supporting a fingerprint authentication function, according to an embodiment.

Referring to FIG. 1, according to an embodiment, an electronic device 100 according to an embodiment of the disclosure may have a tetragonal shape, and at least part of corners of the electronic device 100 may be rounded. Further, the electronic device 100 may be of an edge type in which at least one side of the electronic device 100 (e.g., a left side or a right side of the electronic device 100 with reference to a longitudinal display state of a display 110) is gradually curved as it goes towards a periphery of the electronic device 100. The electronic device 100 may have a form (e.g., a front surface full screen, an edge-to-edge display, or the like) in which the display 110 is expanded to at least one of a lower end or an upper end of a screen.

According to an embodiment, the electronic device 100 may include a fingerprint sensor 120 that senses a fingerprint of a user contacting at least a partial region of the active region on which the screen of the display 110 is displayed. For example, the fingerprint sensor 120 may be disposed in a space (e.g., at the display pixel layer or under the display pixel layer) that is substantially perpendicular (or, facing the thickness direction ('−z' axis)) to at least a partial region of the display 110. The fingerprint sensor 120 may have a specified size (e.g., a size corresponding to a technical and statistical size, by which the fingerprint of the user is capable of being recognized), and may be disposed on one side or the whole region of a rear surface of the display 110 in the form of, for example, a substrate or sheet. The fingerprint sensor 120 may receive at least part of light (e.g., light reflected by a finger contacting the surface of the display 110, or the like) of light illuminated from at least one pixel disposed on the display 110 to configure image information necessary for fingerprint recognition and may store the configured image information in the internal memory (not shown) of the fingerprint sensor 120 or in a memory 450 (see, e.g., FIG. 4) of the electronic device 100 such that the processor (e.g., an application processor (AP), a display driver IC (DDI), a low-power processor, or the like) of the electronic device 100 accesses the image information. According to various embodiments, the fingerprint sensor 120 includes a light emitting unit and a light receiving unit, and may irradiate light by using the light emitting unit under control of the processor, may receive the irradiated light, and may collect the image information necessary for fingerprint authentication.

At least part of the display 110 may be transparent. For example, the display 110 may be provided with a specified transparency (about 2 to 5%) for light in a specific wavelength band (a wavelength band at a periphery of 550 nm). The display 110 may be formed such that a region of the display 110 including at least part of a region in which the fingerprint sensor 120 is disposed is transparent. In this regard, the fingerprint sensor 120 includes a light emitting unit and a light receiving unit, and may irradiate light by using the light emitting unit under control of the processor, may receive the irradiated light, and may collect the image information necessary for fingerprint authentication.

Figure 2:
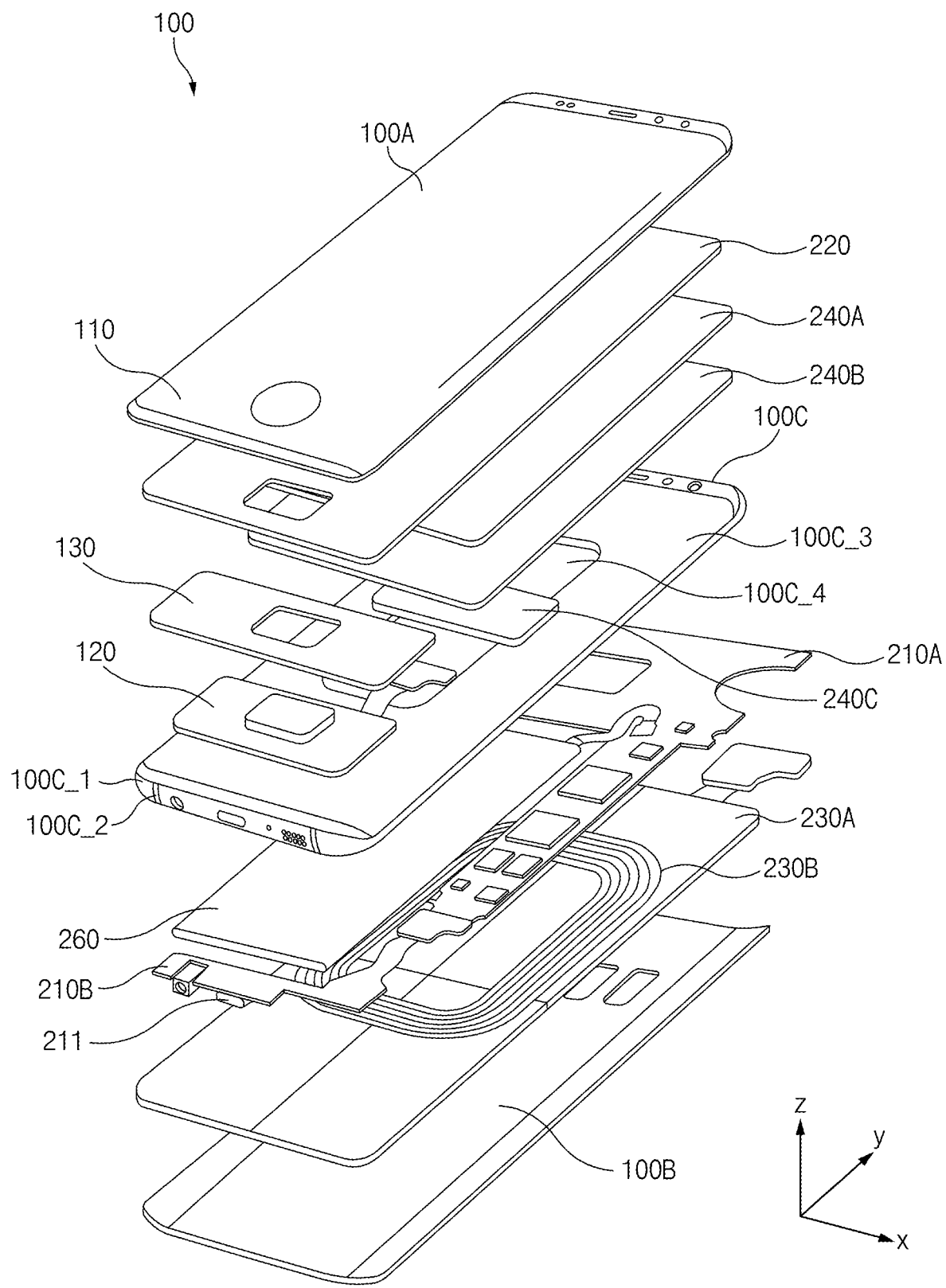
FIG. 2 is an exploded perspective view illustrating an example electronic device supporting a fingerprint authentication function, according to an embodiment.

FIG. 2 is an exploded perspective view illustrating an example electronic device supporting a fingerprint authentication function, according to an embodiment.

Referring to FIG. 2, according to an embodiment, the electronic device 100 (e.g., 100 of FIG. 1) may include housings 100A, 100B, and 100C, the display 110, the fingerprint sensor 120, a pressure sensor 130, and/or printed circuit boards 210A and 210B. In an embodiment, the electronic device may not include some of the above components or may further include any other components. For example, the electronic device 100 may further include an electromagnetic induction panel 220, a conductive film 240A, a dielectric substance (e.g., a sheet) 240B, a conductive feed 240C, and/or a battery 260. In an embodiment, some components may be combined to form one entity, which may identically perform functions of some components before the combination.

According to an embodiment, the housings 100A, 100B, and 100C may include the front plate 100A, the rear plate 100B, and the metal housing 100C. The front plate 100A, the metal housing 100C, and the rear plate 100B may be coupled to one another and may form the front surface, the side surface, and the rear surface of the electronic device 100, respectively. The front surface of the electronic device 100 may be formed by the front plate 100A, at least part of which is transparent. At least part of the front plate 100A may expose the display 110. The rear surface of the electronic device 100 may be formed by the rear plate 100B which is substantially opaque. The front plate 100A may face a first direction (z direction) of the electronic device 100, and the rear plate 100B may face a second direction (−z direction) opposite to the front surface of the electronic device 100.

A side surface 100C_1 of the electronic device 100 may be formed by the metal housing 100C. The metal housing 100C may include the side surface 100C_1 and a plane 100C_3. The side surface 100C_1 of the metal housing 100C may form the side surface 100C_1 of the electronic device 100. The side surface 100C_1 of the metal housing 100C may be connected to at least one RF circuit (not illustrated) of the printed circuit boards 210A and 210B to operate as an antenna. The side surface 100C_1 of the metal housing 100C may be separated into a plurality of structures by a housing slit 100C_2. The housing slit 100C_2 may be formed of a dielectric substance and may separate the structure of the metal housing 100C. The plane 100C_3 of the metal housing 100C may be located between the front plate 100A and the rear plate 100B. The plane 100C_3 of the metal housing 100C may include an upper surface facing the first direction (e.g., z direction) and a lower surface facing the second direction (e.g., −z direction). The display 110 may be mounted on the upper surface of the metal housing 100C. The conductive film 240A and the dielectric substance 240B may be interposed between the display 110 and the upper surface of the plane 100C_3. The pressure sensor 130 or the fingerprint sensor 120 may be further interposed between the display 110 and the upper surface of the metal housing 100C. The pressure sensor 130 or the fingerprint sensor 120 may be disposed in a region where the conductive film 240A and the dielectric substance 240B are not interposed between the upper surface of the metal housing 100C and the display 110. The printed circuit boards 210A and 210B, wireless antenna modules 230A and 230B, or the battery 260 may be interposed between the rear surface of the metal housing 100C and the rear plate 100B. In the case of the wireless antenna modules 230A and 230B, the wireless antenna coil 230B may be formed on the flexible circuit board 230A. The wireless antenna coil 230B may be for NFC, MST, or WPC communication.

The surfaces of the housing 100A, 100B, and 100C exposed to the outside may be used as an antenna. One housing structure may form an inverted F-antenna. The inverted F-antenna may be connected to one feeding and one ground. The one housing structure may be electrically connected to at least one of the printed circuit boards 210A and 210B through a connection member. One end of the one housing structure may be connected to the feeding or ground. The side surface of the metal housing 100C may be separated into a plurality of antenna structures by a slit structure.

The display 110 may display a screen according to a screen ratio (e.g., 18.5:9 (default) or 21:9) determined by a processor. For example, the display region of the display 110 may be distinguished into a first region and a second region. A control object (e.g., a soft key) may be displayed in the first region. For example, the control object may include at least one object of a virtual side key or a home key. The second region may be a region for displaying objects corresponding to various applications. The display 110 may be a touch screen display including a touch sensor panel. For example, the touch sensor panel may have a Y-OCTA structure and may be formed on the display 110.

The touch sensor TSP may sense the touch of the user entered to the display 110. The touch sensor TSP may be implemented to have a size the same as or similar to the size of the display 110 so as to recognize the touch coordinates corresponding to the display region of the display 110. The touch sensor TSP may include an RX electrode and a TX electrode, and may sense the touch of the user based on a change in capacitance. For example, the touch panel of the touch sensor TSP may include the RX electrode and the TX electrode in a single layer. The touch coordinates recognized via the touch sensor TSP may be used in conjunction with the pressure coordinates sensed via the pressure sensor 130.

The pressure sensor 130 may sense the pressure applied to the pressure sensor panel. The pressure sensor 130 may be implemented in a capacitive manner. The pressure sensor 130 may be implemented in a self-capacitance manner and a mutual capacitance. The pressure sensor panel may be implemented with dual layer including an RX electrode layer and a TX electrode layer. A dielectric substance is disposed between the RX electrode layer and the TX electrode layer so as to maintain the gap between the electrode layers. The electrode configuration of the pressure sensor 130 may differ depending on the capacitance type (self-capacitance or mutual capacitance). The pressure sensor 130 may be disposed under the whole region of the display 110 or may be disposed under the partial region of the display 110. An embodiment is exemplified in FIG. 2 as the pressure sensor 130 is disposed under a partial region of the display 110. The pressure sensor 130 may replace a home key button.

For example, the fingerprint sensor 120 may be an optical fingerprint sensor or an ultrasonic fingerprint sensor. The fingerprint sensor 120 may be disposed under the display 110. The fingerprint sensor 120 may receive reflected light during the contact of a user's finger, using the light source of the display 110, may obtain image information necessary for fingerprint authentication of the finger using the reflected light, and may store the obtained image information in the internal memory or in the memory of the electronic device 100.

The printed circuit boards 210A and 210B may include the main board 210A and the sub board 210B. A processor (e.g., AP or CP), a memory, a transmitter and receiver circuit (e.g., a transmitter, a PA, a BPF, a duplexer, or a diplexer), or the like may be disposed on the main board 210A. An interface circuit (e.g., a USB connector 211, an audio connector (e.g., earphone connector), a speaker connection, an antenna connection, or the like) may be disposed on the sub board 210B. A RF signal between the main board 210A and the sub board 210B may be transmitted through a coaxial cable. A signal other than the RF signal between the main board 210A and the sub board 210B may be transmitted through a connector (board to board connector). At least one of the printed circuit boards 210A and 210B may include a connection circuit between components of the RF circuit. At least one of the printed circuit boards 210A and 210B may be electrically connected to the antenna of the metal housing 100C via a connection member. At least one of the printed circuit boards 210A and 210B may be electrically connected to the antenna of the metal housing 100C via a screw and a c-clip. The screw may enhance the electrical characteristics by tightly pressing contacts between the at least one of the printed circuit boards 210A and 210B and the metal housing 100C. The screw may be used to reinforce the ground or the feeding.

The electromagnetic induction panel 220 may be a panel for recognizing a user interface using the stylus pen.

The conductive film 240A may be electrically connected to the ground of the electromagnetic induction panel 220 or to the ground of the display 110. As the ground extends, the conductive film 240A may absorb the noise signal of the electronic device 100 and may form a shield layer. For example, the conductive film 240A may be formed of a copper sheet. The conductive film 240A may be electrically separated from the metal housing 100C by the dielectric substance 240B interposed between the conductive film 240A and the metal housing 100C. The metal housing 100C and the dielectric substance 240B may form mutual AC coupling.

The conductive feed 240C is disposed at the center of the plane slot 100C_4 of the metal housing 100C and may be fixed (attached) thereto. The attachment location of the conductive feed 240C of the metal housing 100C may be changed to adjust the resonant coupling frequency. The shape of the conductive feed 240C may be variously formed depending on a slot shape. The conductive feed 240C may be formed of a material the same as the conductive film 240A or may be formed of a material different from the conductive film 240A. The conductive feed 240C may separate a single loop of the plane slot 100C_4 of the metal housing 100C into a dual loop.

Figure 3:
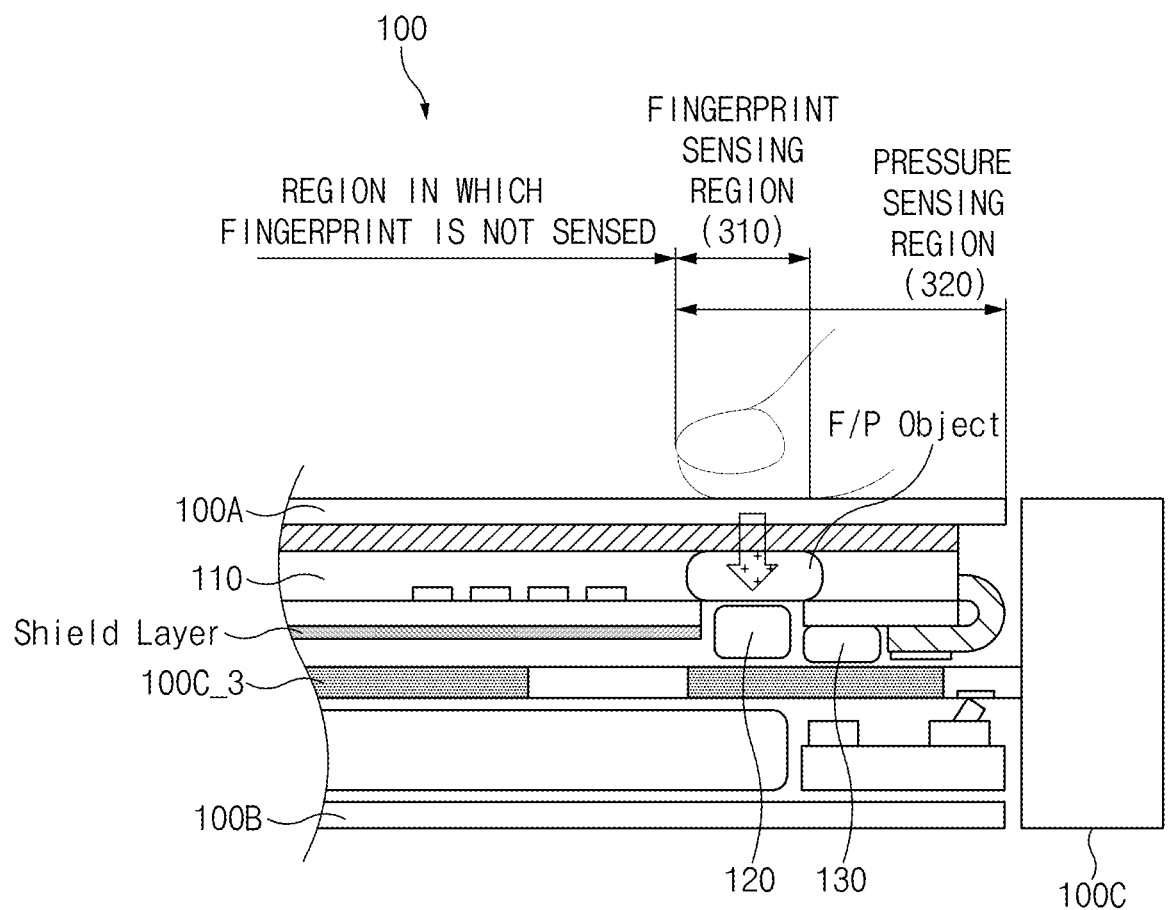
FIG. 3 is a sectional view illustrating an example electronic device, according to an embodiment.

FIG. 3 is a sectional view illustrating an example electronic device (e.g., the electronic device 100 of FIG. 2), according to an embodiment.

Referring to FIG. 3, according to an embodiment, the display region of the display 110 (e.g., 110 of FIG. 1) may include a fingerprint sensing region 310. The fingerprint sensing region 310 may be a region, which overlaps with the fingerprint sensor 120 (e.g., 120 in FIG. 1), in a region of the display 110 when viewed from above the front plate 100A (e.g., 100A of FIG. 2). The fingerprint sensing region 310 may overlap with a pressure sensing region 320 by the pressure sensor 130. As such, while the fingerprint sensor 120 obtains image information about the fingerprint of the user's finger, the pressure sensor 130 may sense the intensity of the pressure by the user's finger.

Figure 4:
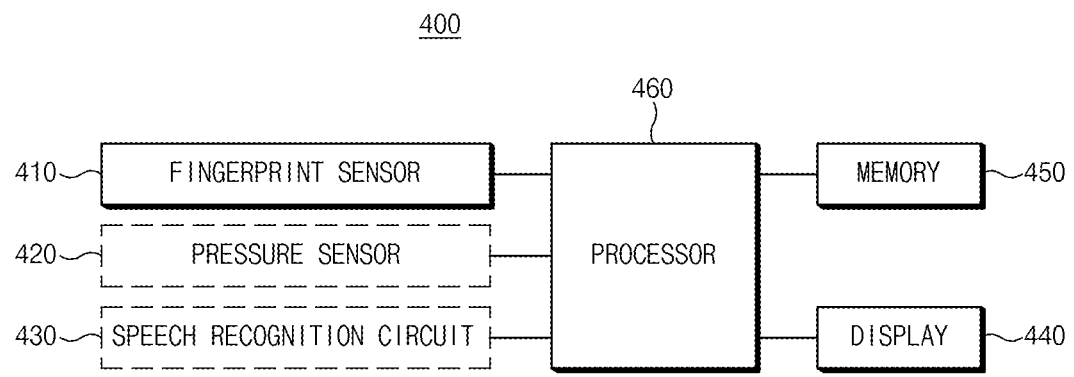
FIG. 4 is a block diagram illustrating an example electronic device, according to an embodiment.

FIG. 4 is a block diagram illustrating an example electronic device (e.g., the electronic device 100 of FIG. 3), according to an embodiment.

Referring to FIG. 4, according to an embodiment, an electronic device 400 may include a fingerprint sensor 410 (e.g., the fingerprint sensor 120 of FIG. 3), a display 440 (e.g., the display 110 of FIG. 3), the memory 450, and a processor (e.g., including processing circuitry) 460. In an embodiment, the electronic device 400 may not include some of the above components or may further include any other components. For example, the electronic device 400 may further include a pressure sensor 420 (e.g., the pressure sensor 130 of FIG. 3), and/or a speech recognition circuit 430. In an embodiment, some components may be combined to form one entity, which may identically perform functions of some components before the combination. The relation between the input and the output illustrated in FIG. 4 may illustrated by way of example for descriptive convenience. Accordingly, embodiments of the disclosure may not be limited thereto. In an embodiment, the fingerprint sensor 410, the pressure sensor 420, the speech recognition circuit 430, the display 440, the memory 450, and the processor 460 may be interposed between the front plate 100A and the rear plate 100B.

According to an embodiment, the fingerprint sensor 410 may be interposed between the display 440 and the rear plate 100B so as to overlap with the fingerprint sensing region 310 of the display 440 when viewed from above the front plate 100A. The fingerprint sensor 410 may obtain image information necessary for fingerprint authentication with respect to a user's finger located in the fingerprint sensing region 310. The fingerprint sensor 410 may store the obtained image information in internal memory or in the memory 450. For example, the fingerprint sensor 410 may be an optical fingerprint sensor or an ultrasonic fingerprint sensor. When the fingerprint sensor 410 is an optical fingerprint sensor, the fingerprint sensor may sense the fingerprint using the light source of the display 440. When the fingerprint sensor 410 is an ultrasonic fingerprint sensor, the fingerprint sensor 410 may include an emitting unit outputting ultrasonic waves and a receiving unit receiving ultrasonic waves.

According to an embodiment, the pressure sensor 420 may be interposed between the display 440 and the rear plate 100B and overlaps with the fingerprint sensing region 310 when viewed from above the front plate 100A. Under control of the processor 460, the pressure sensor 420 may sense the pressure intensity and may output pressure information corresponding to the sensed pressure intensity.

According to an embodiment, the speech recognition circuit 430 may include at least one of a microphone and an audio codec, but the disclosure is not limited thereto. Under control of the processor 460, the speech recognition circuit 430 may detect a voice through a microphone and may output audio data as the result of digitally converting the sensed voice signal through the audio codec.

According to an embodiment, the display 440 may display various content (e.g., a text, an image, a video, an icon, a symbol, and/or the like) to a user. The display 440 may include, for example, and without limitation, a liquid crystal display (LCD), a light-emitting diode (LED) display, an organic LED (OLED) display, an electronic paper display, or the like. The display 440 may be exposed through at least part of the front plate 100A. The display 440 may be a touch screen display. The display 440 may be implemented independently of a touch sensor. However, an example embodiment may include the display 440 is integrated with the touch sensor.

According to an embodiment, the memory 450 may store, for example, instructions or data associated with at least one other component of the electronic device 400. The memory 450 may store instructions that, when executed, cause the processor to display a user interface including an object at a first location of the display 440, to receive a gesture input to drag the object by a finger of a user from the first location to the region, through the display 440, to perform authentication using the fingerprint sensor when the finger is located on the region, and to move the object to the region depending on the gesture input. The memory 450 may be a volatile memory (e.g., a random access memory (RAM) or the like), a nonvolatile memory (e.g., a read only memory (ROM), a flash memory, or the like), or a combination thereof.

According to an embodiment, the processor 460 may include various processing circuitry and perform data processing and/or an operation associated with a control and/or a communication of at least one other component(s) of the electronic device 400 using instructions stored in the memory 450. For example, the processor 460 may include, for example, and without limitation, at least one of a central processing unit (CPU), a graphic processing unit (GPU), a microprocessor, an application processor (AP), an application specific integrated circuit (ASIC), a field programmable gate arrays (FPGA), or the like, and may have a plurality of cores.

According to an embodiment, the processor 460 may output a user interface that includes an object at the first location of the display 440 in the locked state of the electronic device 400. For example, the user interface may be a lock screen. For another example, the user interface may include a notification window, a notification bar, a notification page, or the like. In this disclosure, an embodiment is illustrated as the user interface is the notification window of the lock screen. The notification window may include a plurality of objects. Each of the objects may be a notification associated with an event, which is generated or received by the electronic device 400. The object may be an object received through an application that requires security or an object received through an application that does not require security. The notification may be associated with a message or an e-mail.

According to an embodiment, the processor 460 may display an object (hereinafter referred to as a 'fingerprint position object') indicating a fingerprint sensing region 310 in the fingerprint sensing region 310 in a state where a notification window including a message object is displayed at the first location of the display 440. For example, the fingerprint position object may represent the location of the fingerprint sensing region 310 by the fingerprint sensor 410, and may be in the form of, for example, a fingerprint. The fingerprint position object may always be displayed in the locked state of the electronic device 400.

According to an embodiment, the processor 460 may receive a gesture input to drag a message object by the finger of the user towards the fingerprint sensing region 310, via the display 440; while the gesture input is entered continuously, the processor 460 may move the message object depending on the gesture input. For example, the processor 460 may move the whole notification window including the message object, depending on the gesture input.

According to an embodiment, when receiving a gesture input in which the message object is dragged to the fingerprint sensing region 310, the processor 460 may identify the distance between the fingerprint sensing region 310 (or a fingerprint position object) and the user's finger sensed while moving the notification window depending on the gesture input.

According to an embodiment, the processor 460 may display an object (hereinafter referred to as a "fingerprint affordance object") for inducing fingerprint authentication in the fingerprint sensing region 310 based on the distance between the finger and the fingerprint sensing region. The fingerprint affordance object may be composed of a virtual layer different from a fingerprint position object and may be displayed such that at least part of the fingerprint affordance object overlaps with the fingerprint position object. For example, the processor 460 may display the fingerprint affordance object, when the distance between the fingerprint sensing region 310 and the finger is within a specified distance. For another example, the processor 460 may display the fingerprint affordance object, when the movement of the finger to drag a message object in the third direction (e.g., −y direction) is not less than a specified distance. The specified distance may be determined experimentally. For example, the fingerprint affordance object may be displayed in a region wider than the fingerprint position object. According to the above-described embodiment, the processor 460 may allow a user to easily grasp the location of the fingerprint sensing region 310 by displaying the fingerprint affordance object in a state where fingerprint authentication is required.

According to an embodiment, for example, the processor 460 may activate the fingerprint sensor 410 at the time of displaying the fingerprint affordance object prior to the fingerprint authentication. For example, the processor 460 may deactivate the fingerprint sensor 410 until the fingerprint affordance object is displayed; the processor 460 may activate the fingerprint sensor 410 when displaying a fingerprint affordance object. According to the above-described embodiment, the processor 460 may reduce power consumption due to the fingerprint sensor 410 by activating the fingerprint sensor 410 only when fingerprint authentication is required.

According to an embodiment, when the finger is located on the fingerprint sensing region 310 depending on the gesture input, the processor 460 may perform security authentication using the fingerprint sensor 410. For example, the processor 460 may obtain image information necessary for fingerprint authentication, through the fingerprint sensor 410, may compare the image information with the user's fingerprint image information stored in the memory 450, and may complete security authentication when the comparison results indicates that the image information is the same as the user's fingerprint image information.

According to an embodiment, when the finger is located on the fingerprint sensing region 310 depending on the gesture input, the processor 460 may display a fingerprint authentication object indicating that fingerprint authentication is in progress. The fingerprint authentication object may include a fingerprint position object or a fingerprint affordance object.

When the fingerprint sensor 410 is affected by ambient brightness, for example, when the fingerprint sensor 410 is an optical fingerprint sensor, the processor 460 may adjust the brightness value of the fingerprint authentication object to a value not less than a specified brightness value. For example, the specified brightness value may be experimentally determined as the brightness value that satisfies a fingerprint recognition rate of the specified rate by at least the fingerprint sensor 410. When a notification window (e.g., a message object) overlaps with the fingerprint authentication object during fingerprint authentication, the processor 460 may adjust the transparency of a region that overlaps with the fingerprint authentication object in the notification window. For example, the processor 460 may increase the transparency of the overlapped region of the notification window so as not to interfere with fingerprint recognition due to the region overlapping the fingerprint authentication object in the notification window. According to the above-described embodiment, the processor 460 may prevent an object (e.g., a fingerprint position object or an fingerprint affordance object) indicating a location of the fingerprint sensing region or a fingerprint authentication process from interfering with the fingerprint authentication of the fingerprint sensor 410 during the fingerprint authentication process.

According to an embodiment, when the fingerprint authentication is successful, the processor 460 may display content associated with a message object or another object adjacent to the message object. For example, when the fingerprint authentication is successful, the processor 460 may identify the deep link connected to the message object and may display the preview content in a preview window based on information about the identified deep link. For example, the preview content may include at least part of the content of the message included in the message object. For another example, the preview content may include content from reconstructing the content of a message included in the message object. According to the above-described embodiment, the processor 460 may provide the preview content for the message object by unlocking the lock screen in the locked state of the electronic device 400 or by performing a gesture to drag the message object without executing an application corresponding to the message object.

According to an embodiment, the processor 460 may analyze the contextual content included in the message object and may differently generate the preview content depending on the result of analyzing the contextual content. For example, when the message object includes a text associated with a home, the processor 460 may generate the preview content including a home image or the text associated with the home through an application corresponding to the message object. The processor 460 may expand the message object to correspond to the size of the generated preview content and may display the generated preview content in the expanded message object. According to the above-described embodiment, the processor 460 may improve the visibility of the preview content by reconstructing the message object and then providing the reconstructed message object instead of displaying the content of the message object as it is.

According to an embodiment, the processor 460 may provide a speech recognition interface (e.g., activate the speech recognition circuit 430) based on the pressure intensity sensed through the pressure sensor 420 after fingerprint authentication. For example, in a situation where fingerprint authentication via the fingerprint sensor 410 is performed, when sensing a pressure not less than a specified intensity through the pressure sensor 420, the processor 460 may activate the speech recognition circuit 430, may recognize a speech recognition command through the speech recognition circuit 430 based on speech recognition technology, may execute the speech recognition command through an application corresponding to the message object, and may display the execution result of the speech recognition command in the message object. For another example, when the processor 460 senses a pressure not less than a specified intensity through the pressure sensor 420 while providing a speech recognition interface, the processor 460 may deactivate the speech recognition interface (e.g., deactivation of the speech recognition circuit 430). According to the above-described embodiment, the processor 460 may support a speech recognition interface for the message object after fingerprint authentication, thereby improving the ease of use (e.g., the convenience of a one-handed operation) for the electronic device 400.

According to an embodiment, when a specified time elapses after the gesture input is released, the processor 460 may restore the notification window including the message object expanded due to the preview content, to the state before the gesture input is detected. On the other hand, when the specified time elapses after the preview screen is output, the processor 460 may restore the notification window to the state before the gesture input is detected.

According to the above-described embodiment, the processor 460 may output the preview content corresponding to the object through performing fingerprint authentication once in the locked state of the electronic device 400, without executing an application corresponding to the object included in the notification window.

In the above-described embodiment, the user interface method in which the notification window is displayed on the lock screen is described. However, an embodiment is not limited thereto. For example, the notification window may be displayed on not only the lock screen but also the home screen or application execution screen. Hereinafter, a user interface corresponding to a notification window output from a home screen or an application execution screen will be described.

According to an embodiment, when the primary fingerprint authentication process is completed in a process of unlocking the electronic device 400, the processor 460 may provide a fingerprint authentication interface only for a message object, which requires secondary fingerprint authentication, from among the message objects included in the notification window output on the application execution screen or the home screen (hereinafter collectively referred to as 'application execution screen'). The processor 460 may provide the notification window of the application execution screen in the form different from the notification window of the lock screen. For example, because the notification window of the application execution screen may include more message objects than the notification window of the lock screen, the processor 460 may provide a scroll function corresponding to the touch gesture (e.g., a flick gesture) for the notification window of the application execution screen.

The processor 460 may detect the touch input for displaying the notification window in a state where the application execution screen is displayed. For example, the touch input for activating the notification window may be a gesture input to pull down a specified region at the upper portion of the display 440. In a state where the application execution screen is displayed, when detecting a touch input for displaying the notification window, the processor 460 may activate the notification window. The processor 460 may detect a touch gesture (hereinafter referred to as a "flick gesture") for scrolling a message object in a notification window in a state in which the notification window is activated. When detecting a flick gesture for the scroll, the processor 460 may provide a scroll function for the message object in the notification window. For example, the flick gesture may be a gesture that touches the message object in the notification window and then scrolls down quickly.

When a message object requiring fingerprint authentication overlaps with the fingerprint sensing region 310 or the fingerprint position object while the processor 460 scrolls the list of message objects in the notification window in response to a flick gesture, the processor 460 may stop the scroll, may display the fingerprint affordance object (or fingerprint authentication object) at the overlapped location, may activate the fingerprint sensor 410, and may perform fingerprint authentication via the fingerprint sensor 410. When the fingerprint authentication is successful, the processor 460 may display the preview content corresponding to the message object requiring fingerprint authentication, through the display 440.

After a message object 1022 requiring fingerprint authentication is stopped in the fingerprint sensing region 310, the processor 460 may detect a second flick gesture input 1061 for the notification window. The processor 460 may again execute the scroll function for the notification window depending on the second flick gesture input. The processor 460 may continue to perform a scroll operation on the notification window in response to the flick gesture until another message object 1023 requiring fingerprint authentication reaches the fingerprint input location.

When the topmost (recently received) message object of the notification window reaches the fingerprint input location, the processor 460 may restore the location of the notification window to a location of the notification window before the first flick gesture is detected. According to the above-described embodiment, it is possible to perform a scroll operation for the notification window and a stop operation for the message object requiring fingerprint authentication at the fingerprint input location in response to the flick gesture, thereby improving the convenience of the user's one-hand gesture.

Figure 5:
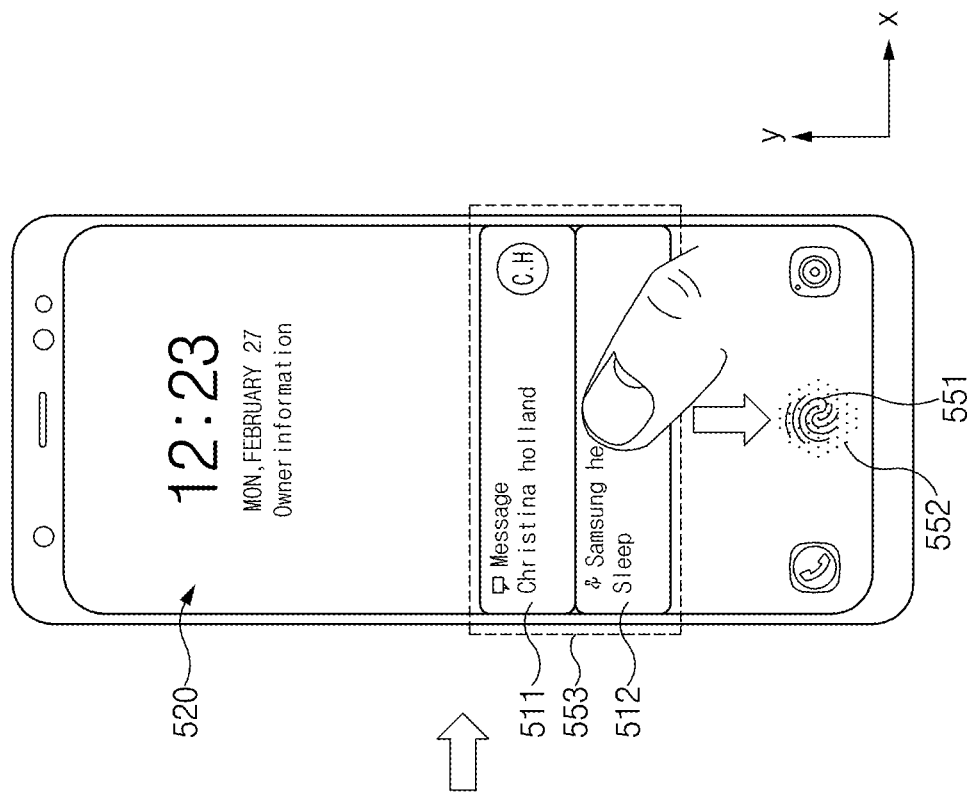
FIG. 5 is a diagram illustrating an example UI screen corresponding to a drag gesture for a message object in a lock screen, according to an embodiment.
Figure 5:
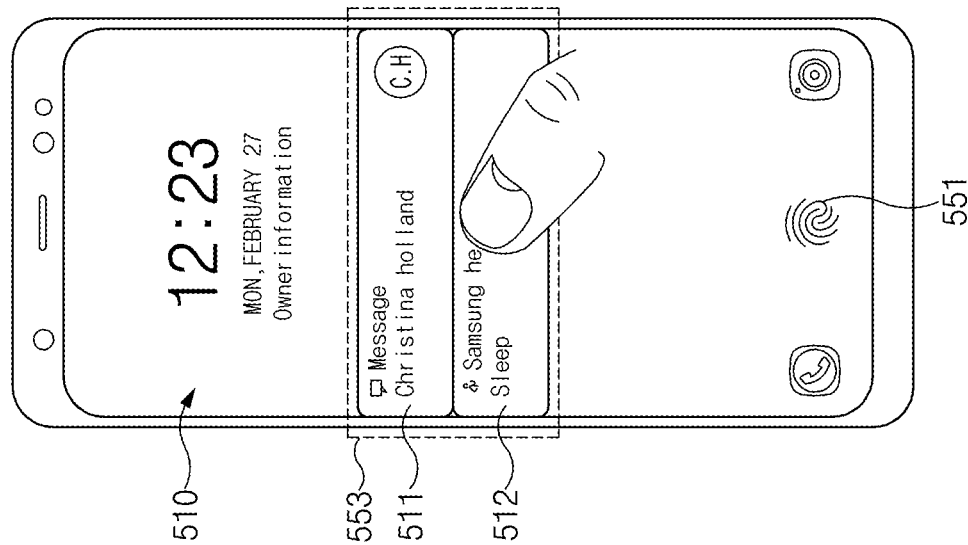

FIG. 5 is a diagram illustrating an example UI screen corresponding to a drag gesture for a message object in a lock screen, according to an embodiment.

Referring to FIG. 5, in screen 510, the processor 460 (e.g., 460 of FIG. 4) may display a notification window 553 including a first object 511 and a second object 512, at the first location of the display 440 (e.g., 440 of FIG. 4) in the locked state of the electronic device 400. The processor 460 may display a fingerprint position object 551 indicating the fingerprint sensing region 310 in the fingerprint sensing region 310, in a state where a notification window is displayed. For example, the fingerprint position object 551 may be always displayed on the lock screen. As another example, the fingerprint position object 551 may be displayed when an object requiring fingerprint authentication is included in the notification window 553 in the unlocked state of the electronic device 400.

In screen 520, when receiving a gesture input to drag the first object 511 by the finger of the user to the fingerprint sensing region 310 through the display 440, the processor 460 may identify the distance between the finger and the fingerprint sensing region 310. When the distance between the finger and the fingerprint sensing region 310 is within a specified distance, for example, the processor 460 may display a fingerprint affordance object 552 that induces fingerprint authentication by overlapping with the fingerprint position object 551, on the fingerprint sensing region 310. When displaying the fingerprint affordance object 552, the processor 460 may activate the fingerprint sensor 410.

Figure 6:
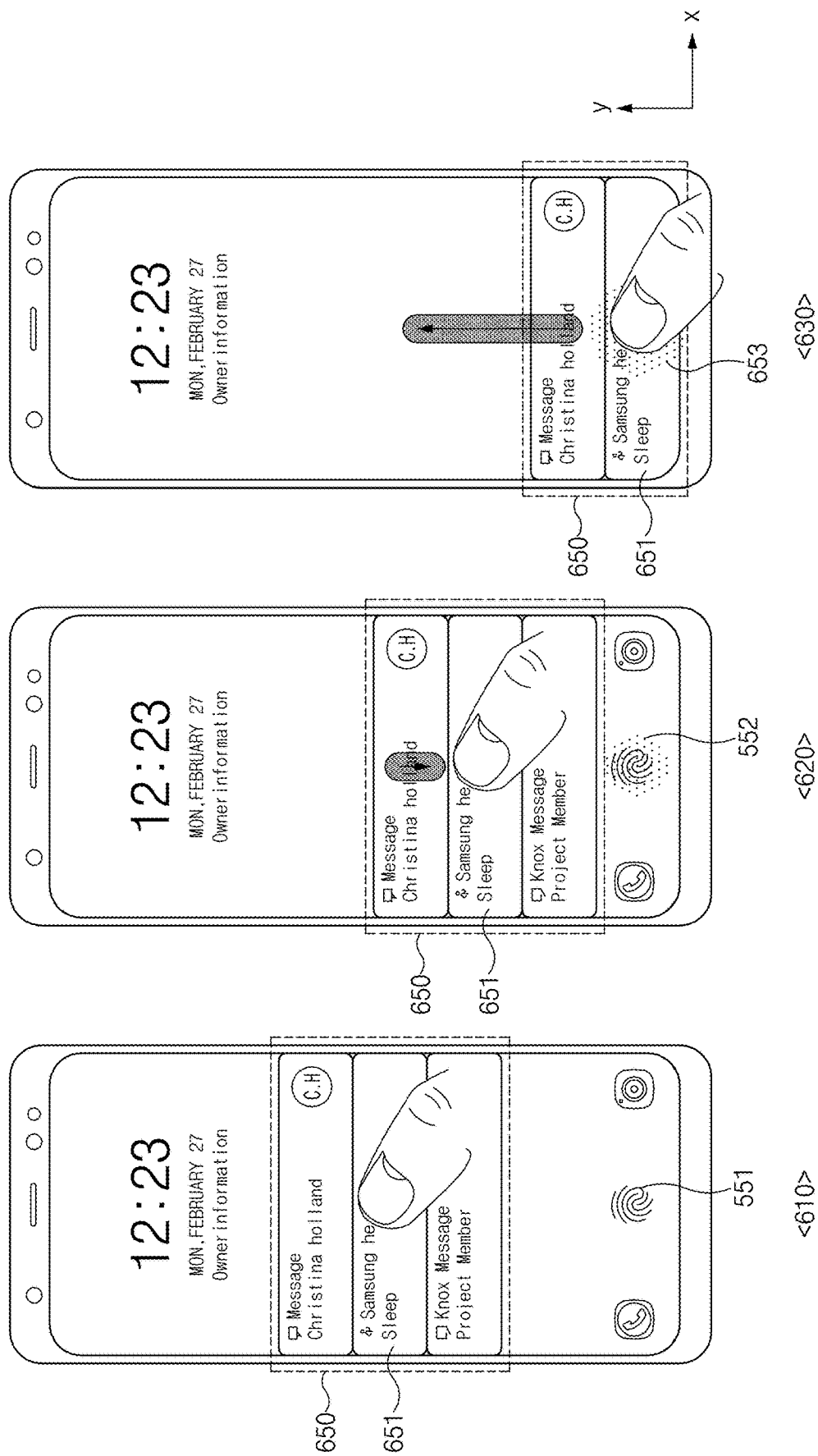
FIG. 6 is a diagram illustrating an example UI screen of a fingerprint authentication process, according to an embodiment.

FIG. 6 is a diagram illustrating an example UI screen of a fingerprint authentication process, according to an embodiment.

Referring to FIG. 6, according to an embodiment, for the purpose of identifying the content of a message object 651 in a notification window 650, the user may select the message object 651 in the notification window 650 using a finger in screen 610, and may perform a gesture to pull down the selected message object 651 toward the fingerprint sensing region 310 in screen 620; and thus the user may locate the finger on the fingerprint sensing region 310 in screen 630.

In screen 610, in a state where the notification window 650 including a plurality of message objects is displayed on the lock screen of the electronic device 400 (e.g., 400 of FIG. 4), the processor 460 (e.g., 460 of FIG. 4) may detect that the message object 651 displayed at the first location of the notification window 650 is touched by the user's finger through the display 440 (e.g., 440 of FIG. 4). The processor 460 may always display the fingerprint position object 551 (e.g., fingerprint position object) indicating the fingerprint sensing region 310, regardless of a screen mode. The processor 460 may display the fingerprint position object 551 so as not to overlap with the notification window 650 in a state where there is no touch input.

In screen 620, when the processor 460 identifies a gesture input in which the finger of the user pulls down the message object 651 from the first location to the fingerprint sensing region 310, the processor 460 may move the message object 651 toward the fingerprint sensing region 310 along a touch input location. For example, the processor 460 may configure the notification window 650 as a separate virtual layer and may move the layer including the notification window 650 along the touch input location.

When identifying the pull-down touch gesture input, the processor 460 generates the fingerprint affordance object 552 (e.g., a fingerprint affordance object) based on the proximity distance between the touch input location and the fingerprint sensing region and may display the generated fingerprint affordance object 552 so as to overlap with the fingerprint position object 551. The fingerprint affordance object 552 may be displayed in a region wider than the fingerprint position object 551. The area of the fingerprint affordance object 552 may coincide with the area of the fingerprint sensing region 310. For example, the fingerprint affordance object 552 may be a fixed image or an animation image. The processor 460 may configure the notification window 650, the fingerprint position object 551, and/or the fingerprint affordance object 552 on different virtual layers, may adjust the shape and transparency of the notification window 650, the fingerprint position object 551 or the fingerprint affordance object 552 when the notification window 650 is moved by the pull-down touch gesture, and may display the notification window 650, the fingerprint position object 551, or the fingerprint affordance object 552 so as to overlap with one another.

The processor 460 may activate the fingerprint sensor 410 and the fingerprint authentication function within a specified time range from a point in time when the fingerprint affordance object 552 is displayed. According to the above-described embodiment, the processor 460 may enable a user to be aware of the activation of the fingerprint sensor 410 and fingerprint authentication function by generating the fingerprint affordance object 552 and may induce the movement of the touch input location towards the fingerprint affordance object 552. In addition, the processor 460 may reduce the current consumption of the fingerprint sensor 410 by activating the fingerprint sensor 410 at a point in time when fingerprint authentication is required.

In screen 630, when the touch input location is included in the fingerprint sensing region 310, the processor 460 may perform fingerprint authentication on a finger. When performing fingerprint authentication, the processor 460 may display a fingerprint authentication object 653 indicating that fingerprint authentication is being performed. When the fingerprint authentication is being performed, the processor 460 may not display the fingerprint position object 551. When the fingerprint sensor 410 is an optical fingerprint sensor, the processor 460 may display the fingerprint authentication object 653 in color series (e.g., white series) suitable for fingerprint authentication. For example, when the fingerprint sensor 410 is an optical fingerprint sensor, the processor 460 may control the brightness value of the fingerprint authentication object 653 to be greater than the brightness value of the fingerprint affordance object. For example, the fingerprint authentication object 653 may be displayed in an area wider than the fingerprint sensing region 310 or the fingerprint position object 551. The fingerprint authentication object 653 may be displayed as an opacity image to increase the success rate of fingerprint authentication. According to the above-described embodiment, the electronic device 400 may provide a user interface (e.g., a third object) in the form that enables the user to better understand the fingerprint authentication process.

Figure 7A:
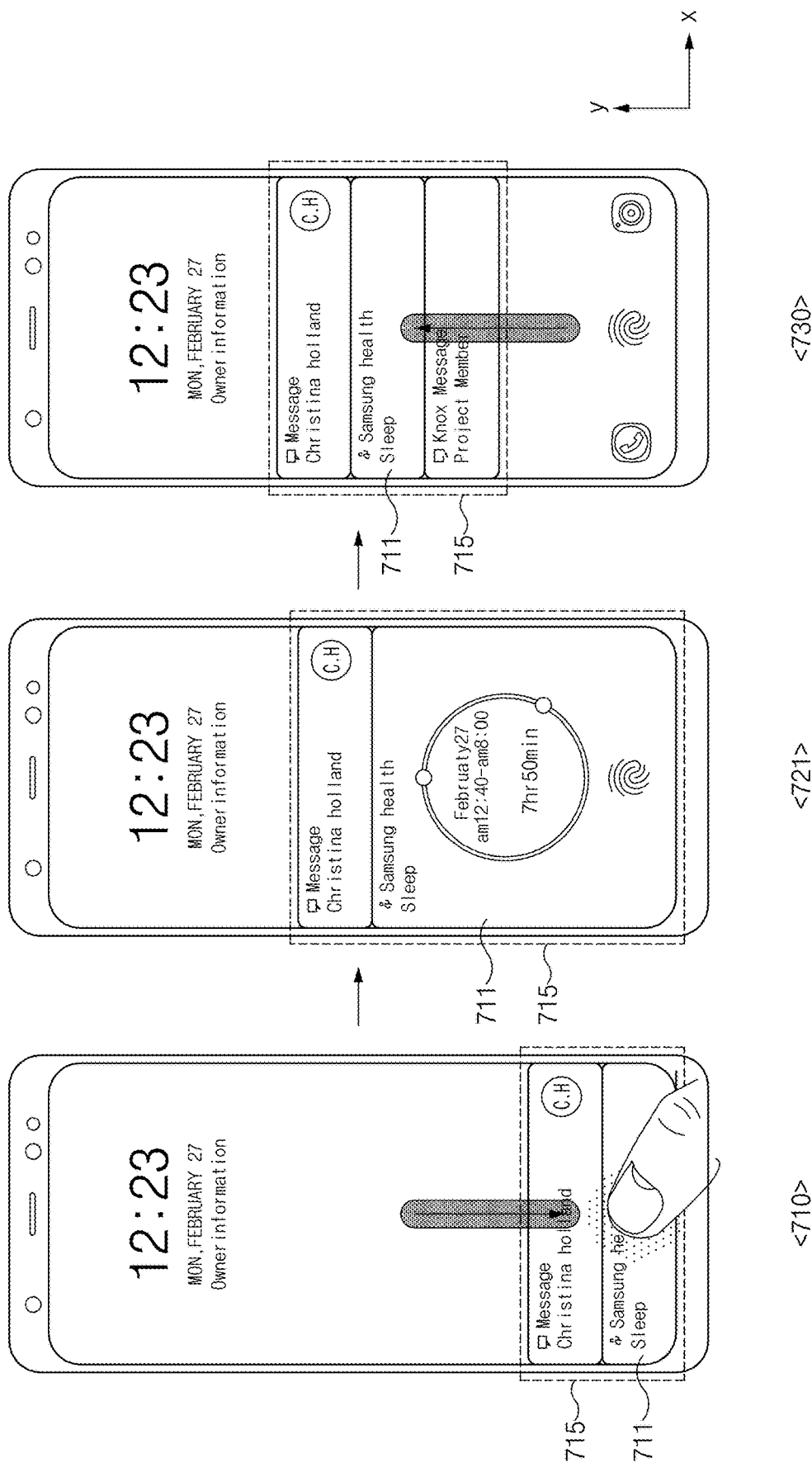
FIGS. 7A and 7B are diagrams illustrating example UI screens after a fingerprint authentication process, according to an embodiment.
Figure 7B:
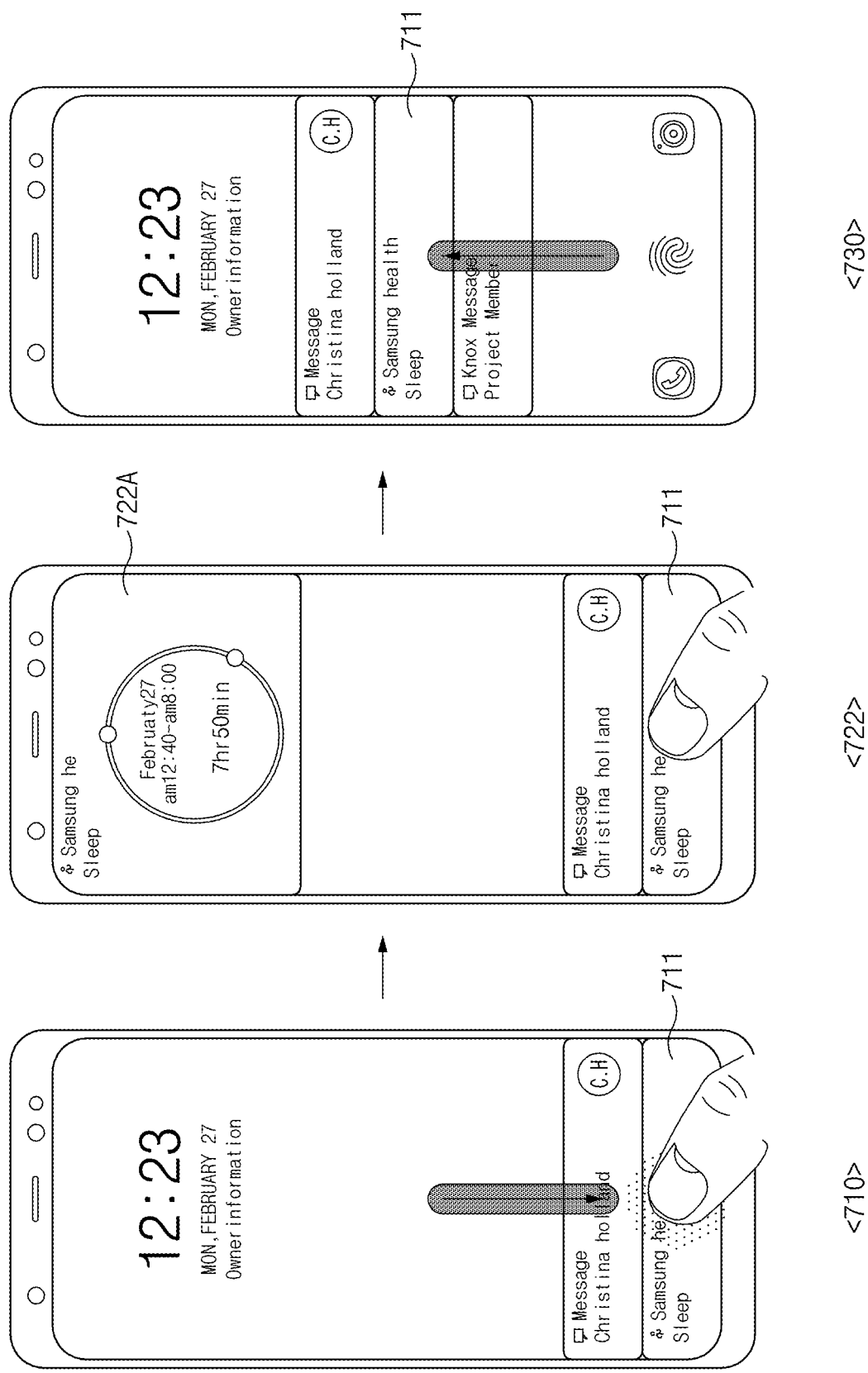

FIGS. 7A and 7B are diagrams illustrating example UI screens after a fingerprint authentication process, according to an embodiment.

In screen 710 of FIGS. 7A and 7B, the processor 460 (e.g., 460 of FIG. 4) may perform fingerprint authentication based on a pull-down touch gesture for a message object 711 in a notification window 715, in the locked state of the electronic device 400 (e.g., 400 of FIG. 4).

In screen 721 of FIG. 7A and screen 722 of FIG. 7B, when the fingerprint authentication is successful, the processor 460 may display the preview content (or application content) of the selected message object 711 in the preview window form through the display 440 (e.g., 440 of FIG. 4). The processor 460 may display the preview window and the preview content in a variety of ways. For example, as illustrated in screen 721 of FIG. 7A, the processor 460 may display the preview content in a region in which the message object 711 is expanded. For another example, as illustrated in screen 722 of FIG. 7B, the processor 460 may display a preview window 722A at a location different from the location of the message object 711 and may display the preview content within the preview window 722A. In an embodiment, the processor 460 may expand the display region of the message object 711 and may display the user interface of the fingerprint authentication process within the expanded message object 711. For example, the processor 460 may display a fingerprint authentication-related object (e.g., fingerprint position object or fingerprint affordance object) within the expanded message object 711. In this case, the processor 460 may distinguish the display region of the preview content from the display region of the fingerprint authentication-related object such that the preview content and the fingerprint authentication-related object do not overlap with each other in the message object 711.

In screen 730 of FIGS. 7A and 7B, when the specified time elapses after the processor 460 outputs the preview content, the processor 460 may restore the notification window 715 to a location before the pull-down touch gesture is input. When receiving a user input (e.g., a pull-up gesture) to restore the notification window 715, the processor 460 may restore the notification window 715 to a location before the pull-down touch gesture is input. For example, the pull-up gesture may include a gesture to scroll the notification window 715 from bottom to top.

According to various embodiments, there may be a variety of methods in each of which the processor 460 provides the preview content linked to the message object 711 through a preview window 722A. For example, the processor 460 may analyze the contextual content included in the message object through the machine learning engine and may configure the preview content based on the analysis result. The machine learning engine may include a natural language processing engine, a BOT framework, or a rule engine. For example, the processor 460 may analyze the content of at least one of all images, texts, links, or videos included in the received message through the natural language processing (NLP) engine, may determine the action plan based on the contextual content analyzed through the BOT framework and the rule engine, and may configure the preview content according to the action plan determined through the application linked to the received message.

Figure 8A:
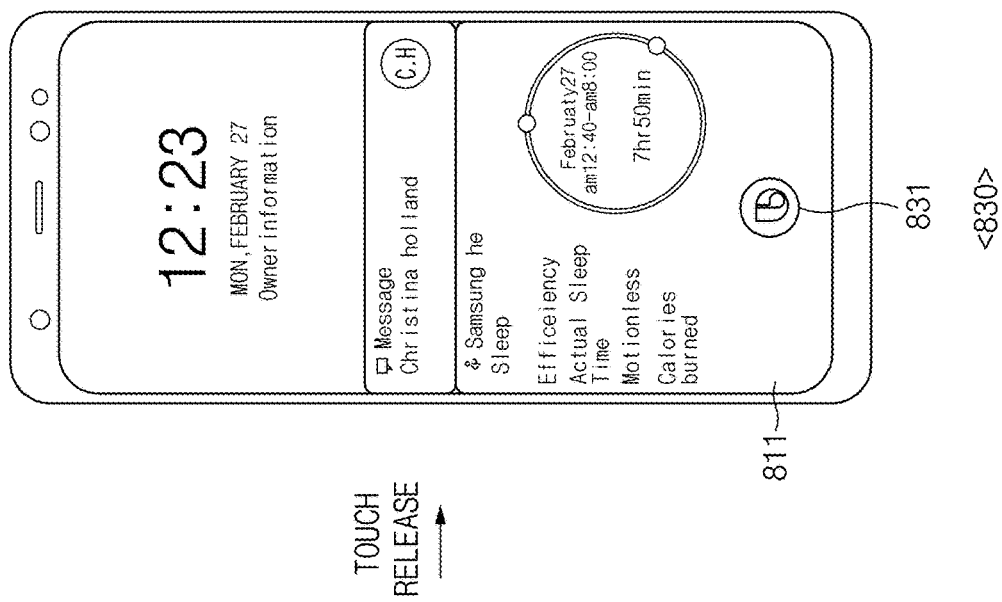
FIG. 8A is a diagram illustrating an example UI screen of a process of activating a speech recognition function, according to an embodiment.
Figure 8A:
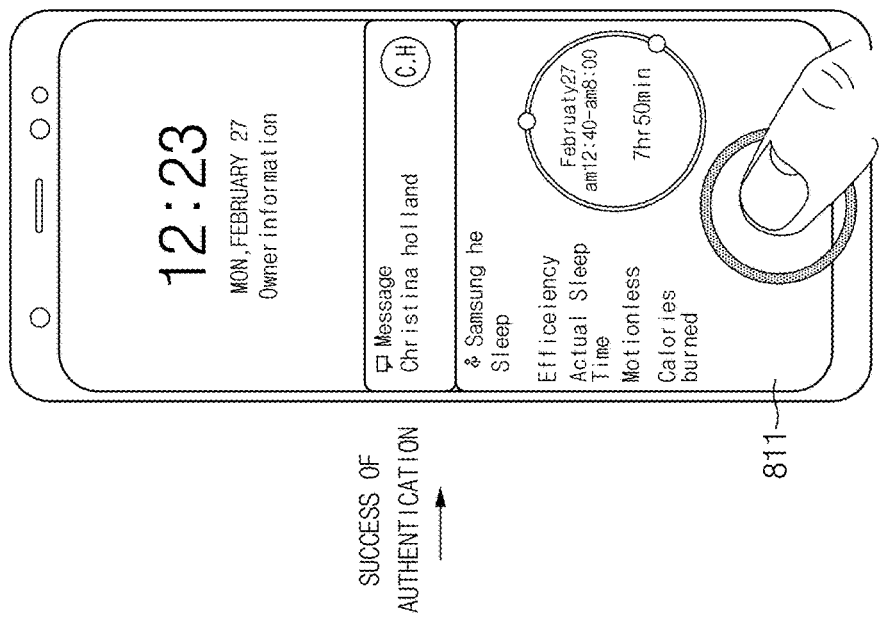
Figure 8A:
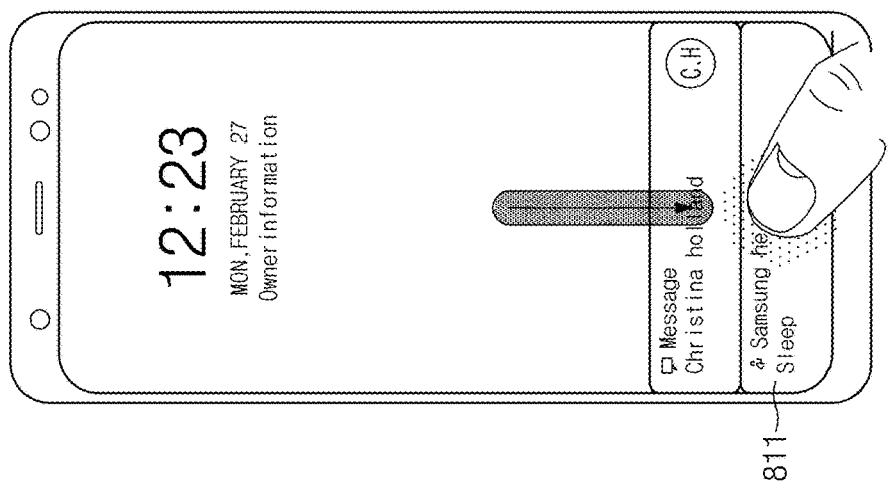

FIG. 8A is a diagram illustrating an example UI screen of a process of activating a speech recognition function, according to an embodiment.

In screen 810, the processor 460 (e.g., 460 of FIG. 4) may perform fingerprint authentication based on a pull-down touch gesture for a message object 811 in a notification window displayed on a lock screen.

In screen 820, the processor 460 may detect a pressure touch gesture of a specified strength or more after fingerprint authentication.

In screen 830, the processor 460 may activate the speech recognition function based on a pressure of a specified strength or more after the fingerprint authentication and may display the first speech recognition object (e.g., Bixby Interface) 831 through the display 440, instead of the fingerprint position object. The processor 460 may continuously activate (voice stand-by) the speech recognition circuit 430 so as to obtain (e.g., record) the user's voice in a state where the first speech recognition object 831 is displayed.

Figure 8B:
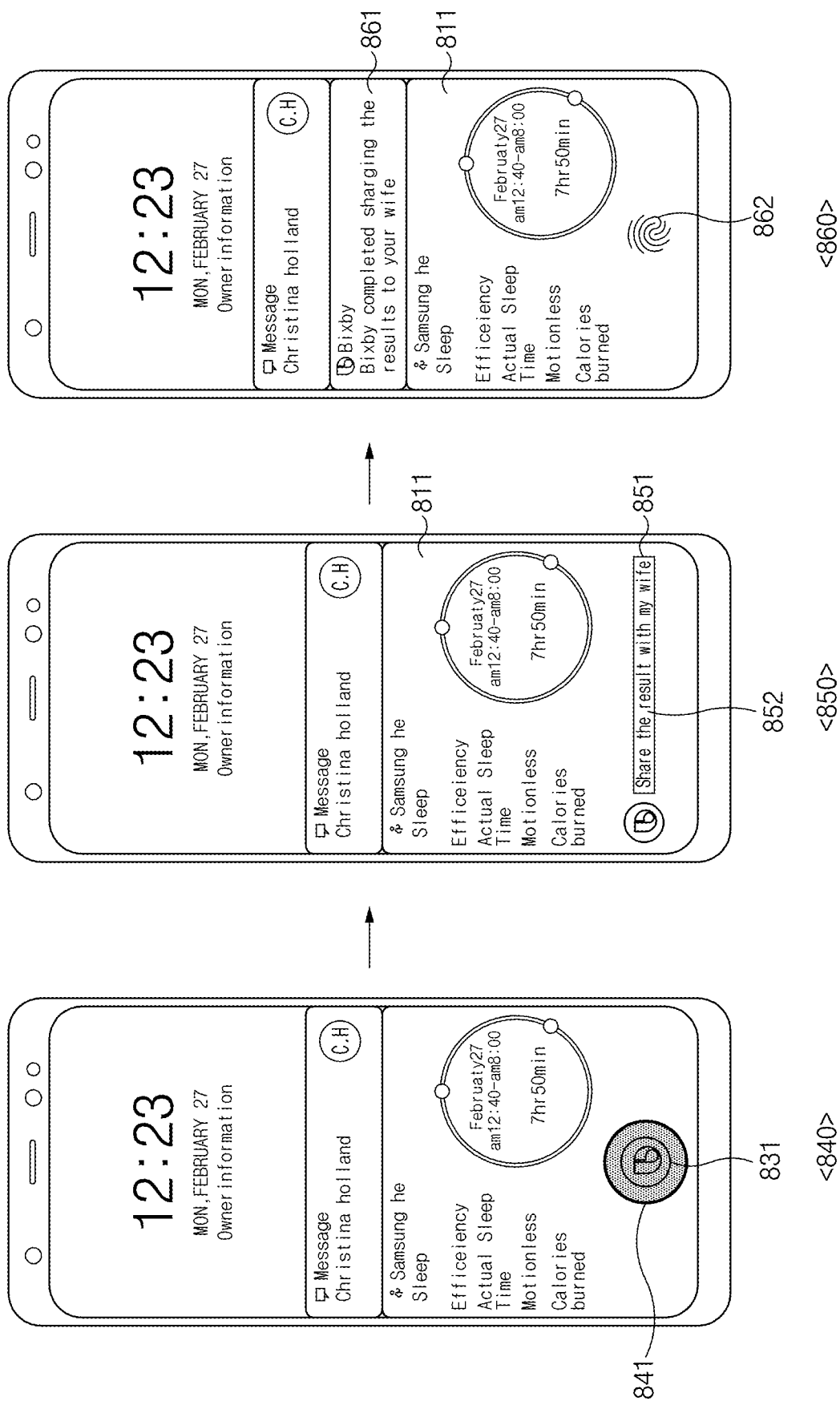
FIG. 8B is a diagram illustrating an example UI screen of a process of executing a speech recognition function, according to an embodiment.

FIG. 8B is a diagram illustrating an example UI screen of a process of executing a speech recognition function, according to an embodiment.

In screen 840, the processor 460 may obtain (e.g., record) a voice command through the speech recognition circuit 430 (e.g., 430 of FIG. 4). While obtaining a voice command, the processor 460 may display a second speech recognition object 841 indicating that a voice command is being obtained. The second speech recognition object 841 may represent a voice recording state or a natural language processing state (e.g., during voice recording, while processing natural language, or the like).

In screen 850, when the processor 460 obtains a voice command, the processor 460 may convert the obtained voice command into a text command. For example, the processor 460 may analyze the voice command through the NLP engine and may convert the voice command to a text by the natural language generation (NLG) engine. The processor 460 may display the converted text 852 in a voice command window 851 in the message object.

In screen 860, the processor 460 may perform processing corresponding to the voice command through the application corresponding to the message object 811 and may output the command execution result through a new message object 861. For example, the processor 460 may process a voice command input through the notification manager or machine learning engine and may display the result of processing the voice command by generating the new message object 861 in the notification window. The new message object 861 may be displayed adjacent to the message object 811 (e.g., immediately above the message object). For another example, the processor 460 may display the result of processing the voice command together with other messages in the message object 811.

In screen 860, in a state where the first speech recognition object is displayed, when detecting a pressure of a specified intensity or more, the processor 460 may deactivate the speech recognition function (e.g., deactivate the speech recognition circuit 430). In this case, the processor 460 may display a fingerprint position object 862 instead of the first speech recognition object.

Figure 9:
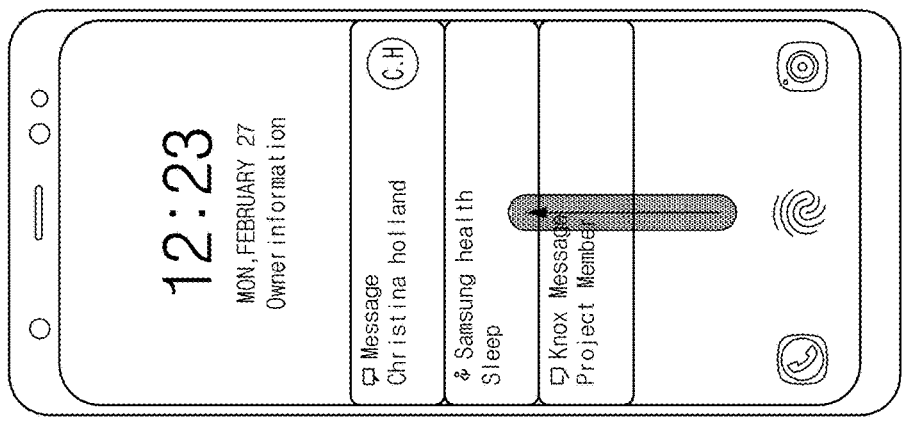
FIG. 9 is a diagram illustrating an example of a plurality of preview content outputting methods, according to an embodiment.
Figure 9:
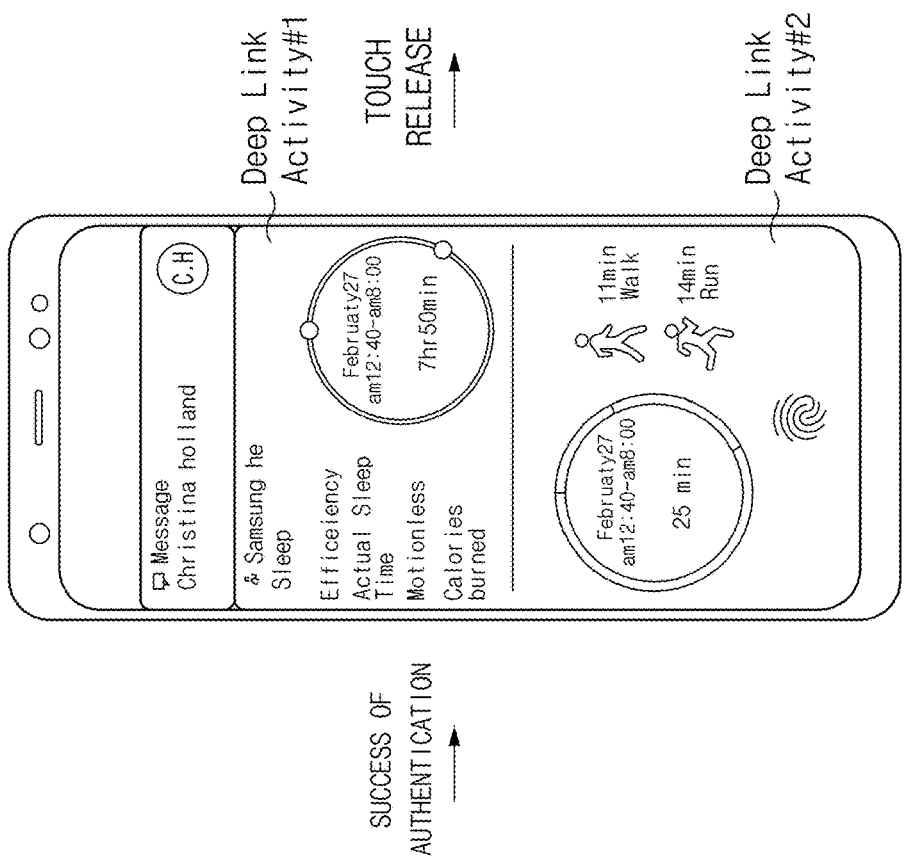
Figure 9:
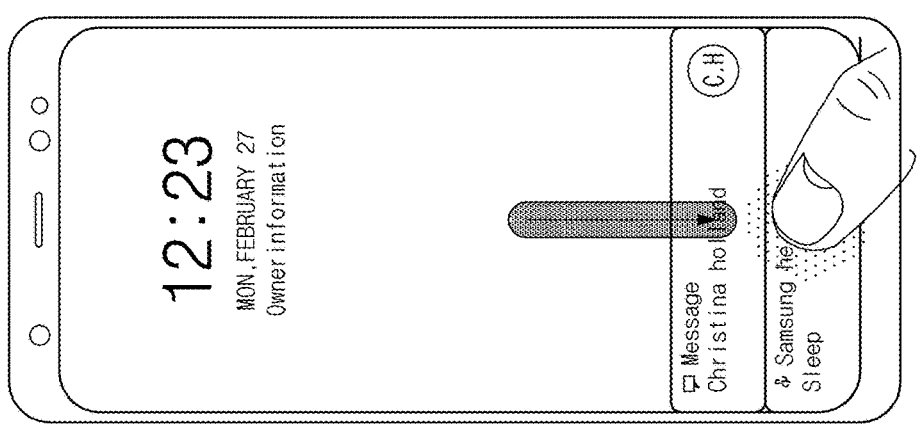

FIG. 9 is a diagram illustrating a plurality of example preview content outputting methods, according to an embodiment.

In screen 910, the processor 460 (e.g., 460 of FIG. 4) may perform fingerprint authentication based on a pull-down touch gesture for a message object in a notification window displayed on a lock screen.

In screen 920, the processor 460 may identify that a plurality of messages are included in the message object, after the fingerprint authentication is successful. For example, when deep link activity associated with each message is different, the processor 460 (e.g., deep link manager) may make a request for each preview content to the application corresponding to the message object. The processor 460 (e.g., notification manager) may configure each preview content received from the application as a page, and may display the configured page through the message object in the notification window.

In screen 930, when a specified time elapses after touch is released or when a gesture of the user to restore the notification window to the previous location and size is detected, the processor 460 may not display the preview content anymore and may restore the notification window to the location and size before the pull-down touch gesture is detected.

In the above-described embodiment, a user interface method in which a notification window is displayed on a lock screen is described. However, the notification window may be displayed on not only the lock screen but also the home screen or application execution screen. Hereinafter, the user interface method corresponding to a notification window output from a home screen or an application execution screen will be described.

Figure 10A:
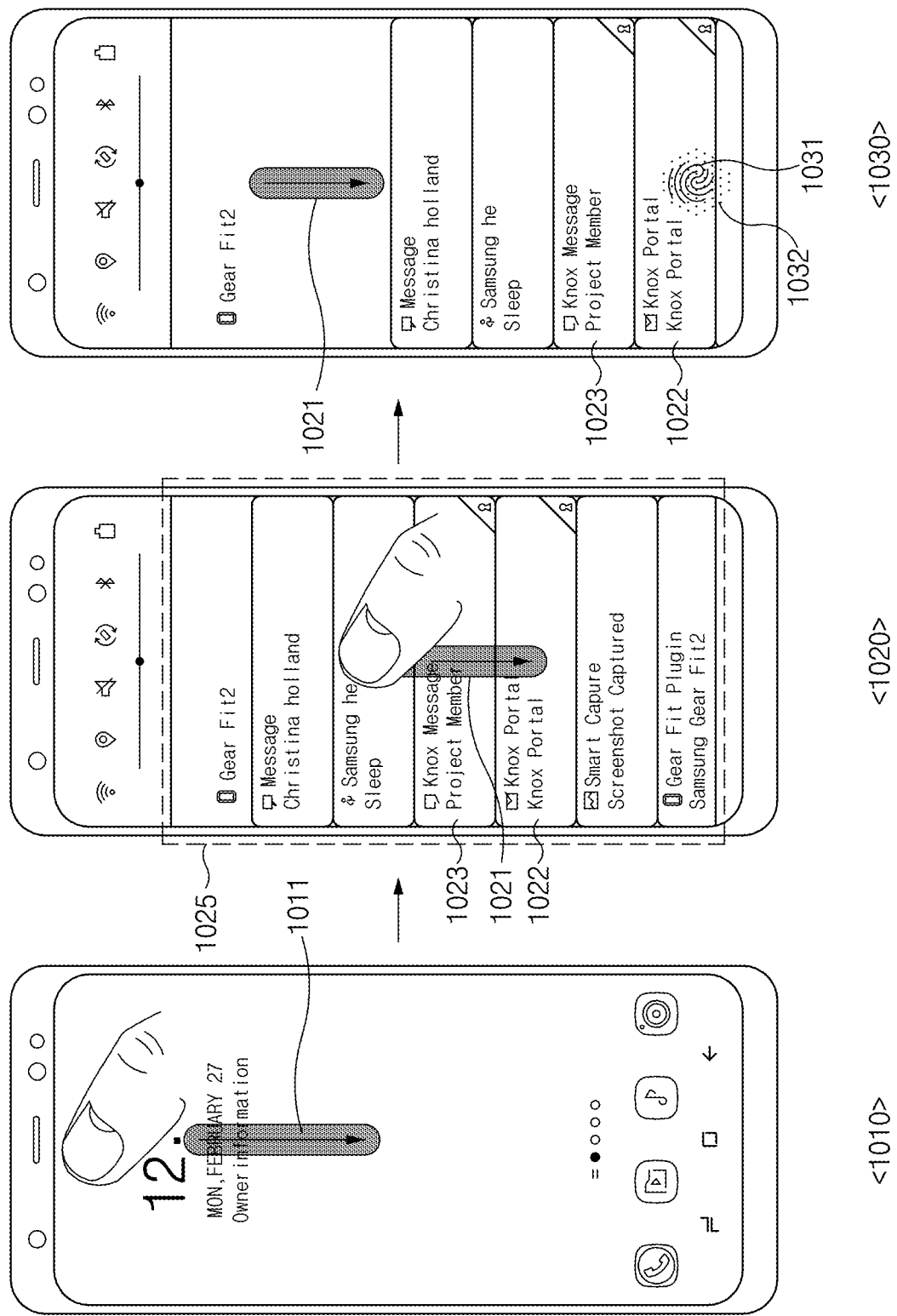
FIGS. 10A and 10B are diagrams illustrating an example UI screen of a fingerprint authentication process corresponding to a notification window of an application execution screen, according to an embodiment.
Figure 10B:
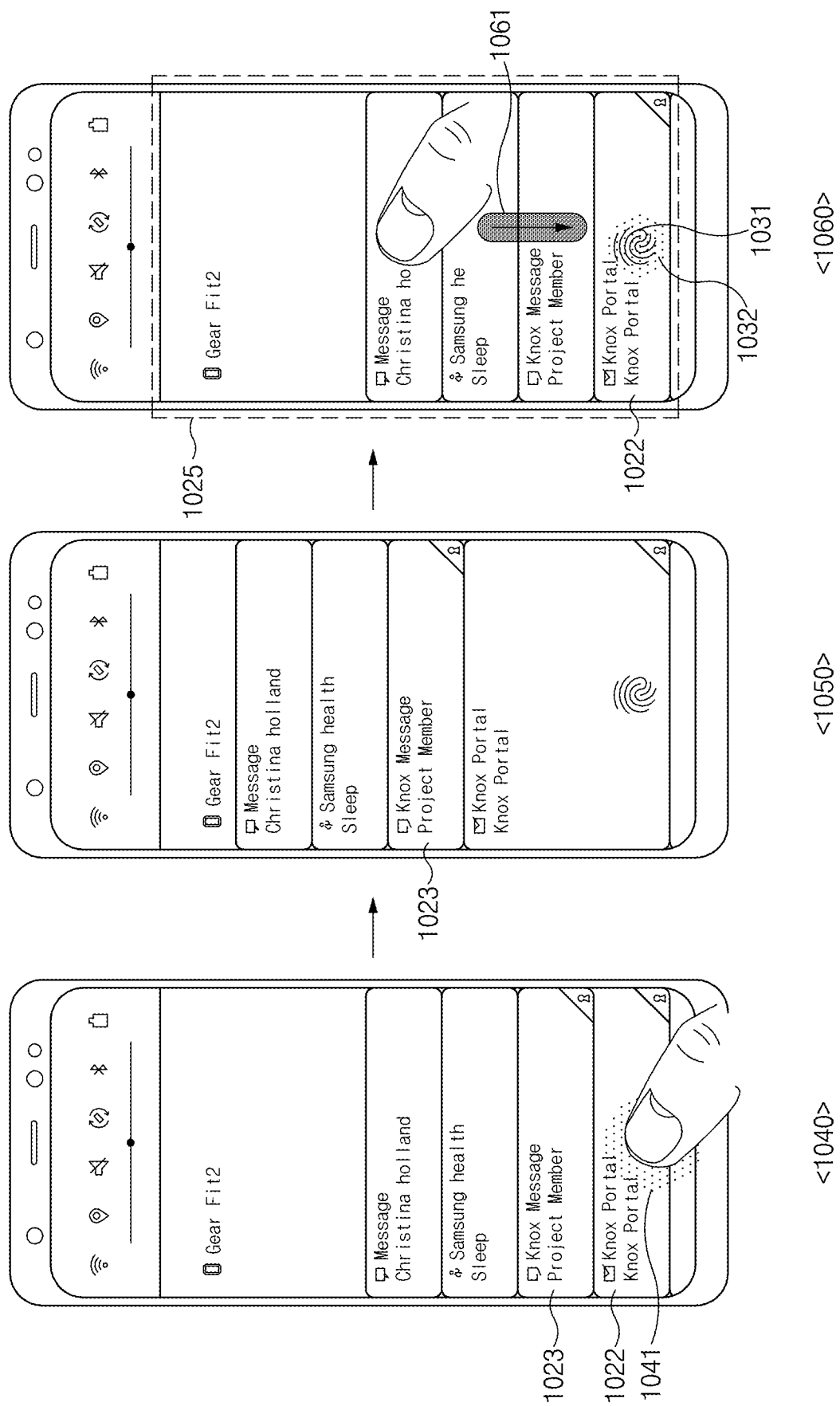

FIGS. 10A and 10B are diagrams illustrating an example UI screen of a fingerprint authentication process corresponding to a notification window of an application execution screen, according to an embodiment. FIG. 10A illustrates a user interface of a process of authenticating a fingerprint depending on a swipe gesture input in a notification window displayed on a home screen or application execution screen.

Referring to FIG. 10A, according to an embodiment, the processor 460 (e.g., 460 of FIG. 4) may also provide preview content through a message object together with fingerprint authentication on the home screen or application execution screen. When the first fingerprint authentication process is completed during the unlocking of the electronic device 400 (e.g., 400 of FIG. 4), the processor 460 may provide a fingerprint authentication interface only for the message object requiring fingerprint authentication among the message objects included in the notification window output from the home screen or application execution screen. The notification window of the application execution screen may be provided in a form different from the notification window of the lock screen. Because the notification window of the application execution screen may include more message objects than the notification window of the lock screen, the processor 460 may provide a scroll function corresponding to the touch gesture (e.g., a flick gesture).

In screen 1010, the processor 460 may detect the touch input for displaying the notification window in a state where the home screen or the application execution screen is displayed. For example, a touch input 1011 for activating the notification window may be a gesture input to pull down a specified region of the upper portion of the display 440. In a state where the home screen or the application execution screen is displayed, when detecting a touch input for displaying the notification window, the processor 460 may activate the notification window.

In screen 1020, the processor 460 may detect a touch gesture 1021 for scrolling a message object in a notification window in a state in which the notification window is activated. When detecting the touch gesture 1021 for the scroll, the processor 460 may provide a scroll function for the message object in the notification window.

In screen 1030, when the message object 1022 requiring fingerprint authentication overlaps with the fingerprint sensing region 310 or a fingerprint position object 1031 while the processor 460 scrolls the list of message objects in the notification window in response to the touch gesture 1021, the processor 460 may stop the scroll, may display a fingerprint affordance object 1032 at the overlapped location, and may activate a fingerprint authentication interface through the fingerprint sensor 410.

Referring to FIG. 10B, in screen 1040, the processor 460 may perform fingerprint authentication through the fingerprint sensor 410. The processor 460 may display a fingerprint authentication object 1041 while fingerprint authentication is being performed.

In screen 1050, when the fingerprint authentication is successful, the processor 460 may display the preview content corresponding to the message object, of which fingerprint authentication is successful, through the display 440.

In screen 1060, after the message object 1022 requiring fingerprint authentication is stopped at the fingerprint input location, the processor 460 may detect the second flick gesture input 1061 for another message object 1023 requiring fingerprint authentication. The processor 460 may again execute the scroll function for a notification window 1025 depending on an additional flick gesture input. The processor 460 may continue to perform a scroll operation on the notification window in response to the flick gesture until another message object 1023 reaches the fingerprint input location.

When the topmost (recently received) message object of the notification window 1025 reaches the fingerprint input location, the processor 460 may restore the location of the notification window to a location of the notification window before the first flick gesture is detected. According to the above-described embodiment, it is possible to perform a scroll operation for the notification window and a stop operation for the message object requiring fingerprint authentication at the fingerprint input location in response to the flick gesture, thereby improving the convenience of the user's one-hand gesture.

Figure 11:
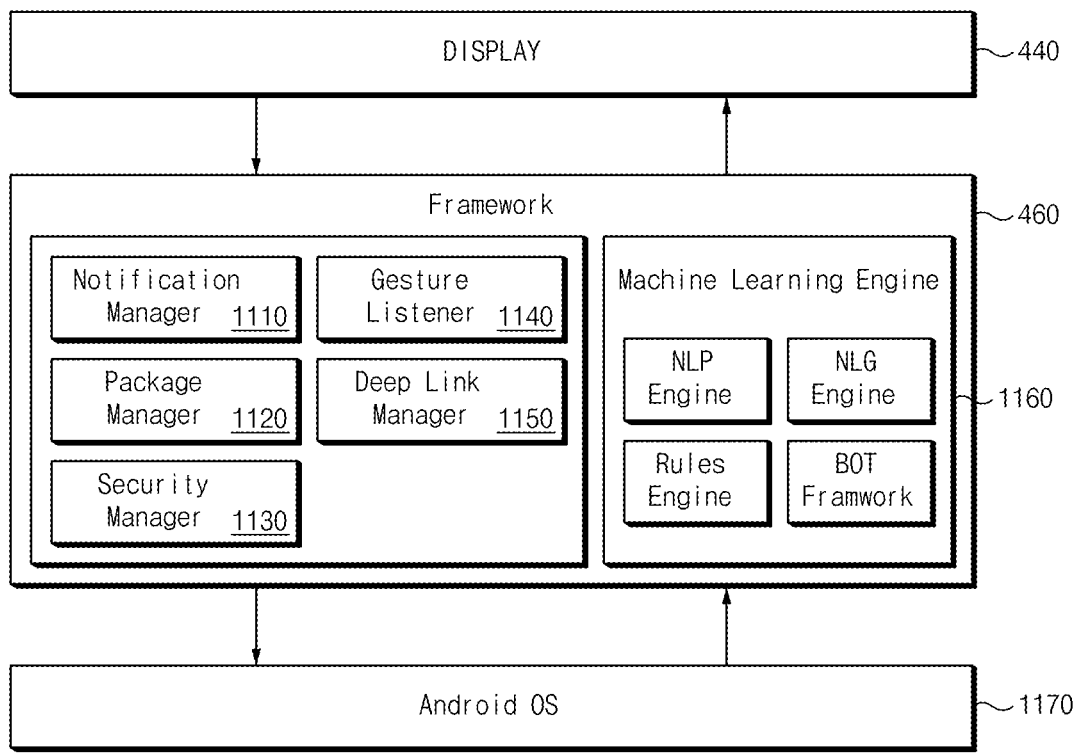
FIG. 11 is a block diagram illustrating an example processor, according to an embodiment.

FIG. 11 is a block diagram illustrating an example processor, according to an embodiment.

Referring to FIG. 11, according to an embodiment, the processor (e.g., including processing circuitry) 460 (e.g., 460 of FIG. 4) may include an operating system 1170, a notification manager (e.g., including processing circuitry and/or executable program elements) 1110, a gesture listener (e.g., including processing circuitry and/or executable program elements) 1140, a package manager (e.g., including processing circuitry and/or executable program elements) 1120, a deep link manager (e.g., including processing circuitry and/or executable program elements) 1150, a security manager (e.g., including processing circuitry and/or executable program elements) 1130, and a machine learning engine (e.g., including processing circuitry and/or executable program elements) 1160. Elements of the processor 460 may be a separate hardware module or may be a software module implemented by at least one processor 460. For example, the function of each of the modules included in the processor 460 may be performed by one processor 460 or may be performed by each separate processor.

The gesture listener 1140 may include various processing circuitry and/or executable program elements and detect a gesture input for fingerprint authentication for the message object in the notification window. The gesture listener 1140 may display a fingerprint authentication-related object (e.g., fingerprint affordance object or fingerprint authentication object) on the display 440 (e.g., 440 of FIG. 4) based on the distance between the message object and the fingerprint sensing region 310. The gesture listener 1140 may detect a pressure gesture for activating the speech recognition interface.

The security manager 1130 may include various processing circuitry and/or executable program elements and perform a fingerprint authentication process for the user's finger. The security manager 1130 may inform the deep link manager 1150 of the success of fingerprint authentication.

The deep link manager 1150 may include various processing circuitry and/or executable program elements and connect to the deep link in conjunction with a message object.

The machine learning engine 1160 may include various processing circuitry and/or executable program elements and analyze the contextual content included in the message corresponding to the message object, may generate an action plan based on the analyzed content, and may make a request for preview content corresponding to the generated action plan to the notification manager 1110. The machine learning engine 1160 may further configure an action plan corresponding to the speech recognition command obtained through the speech recognition circuit 430 (e.g., 430 of FIG. 4).

The notification manager 1110 may include various processing circuitry and/or executable program elements and configure the preview content according to the action plan through the application corresponding to the message object, may expand the display region of the message object, and may display the preview content within the expanded object through the display 440.

Figure 12:
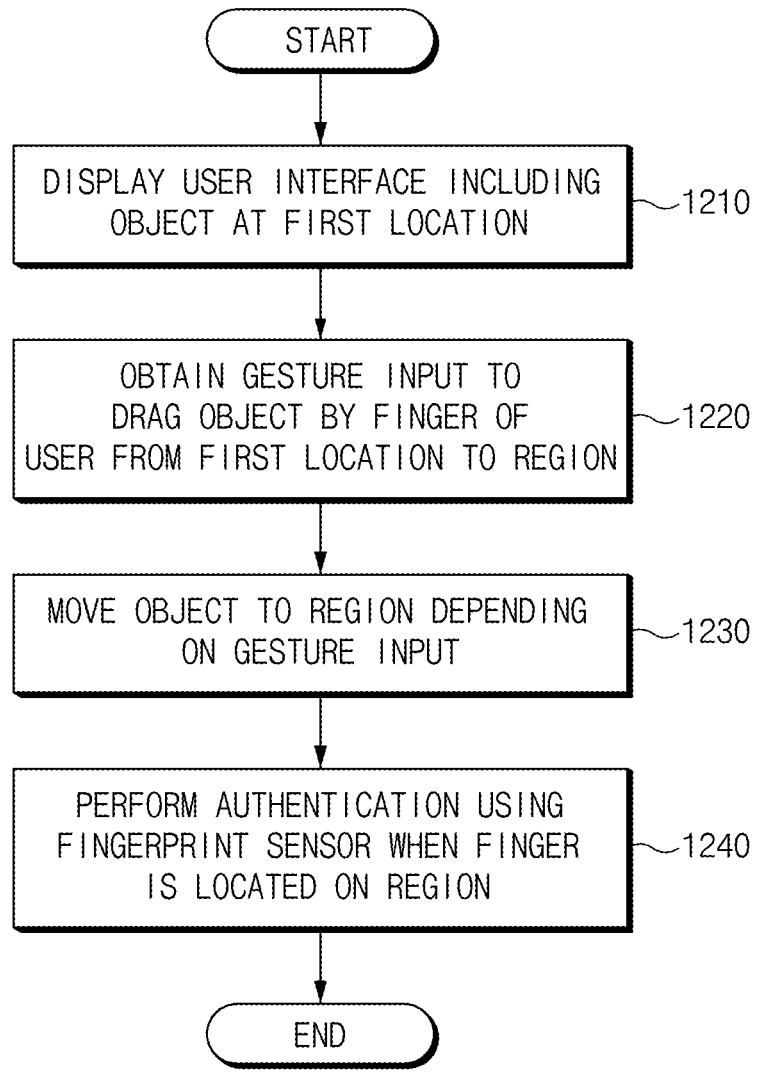
FIG. 12 is a flowchart illustrating an example fingerprint authentication method, according to an embodiment.

FIG. 12 is a flowchart illustrating an example fingerprint authentication method, according to an embodiment.

Referring to FIG. 12, in operation 1210, the processor 460 (e.g., 460 of FIG. 4) may display a user interface including an object at a first location of the display 440 (e.g., 440 of FIG. 4).

In operation 1220, the processor 460 may obtain a gesture input to drag the object by a finger of a user from the first location to the region, through the display.

In operation 1230, the processor 460 may move the object to the region depending on the gesture input.

In operation 1240, the processor 460 may perform authentication using the fingerprint sensor 410 when the finger is located on the region.

Figure 13:
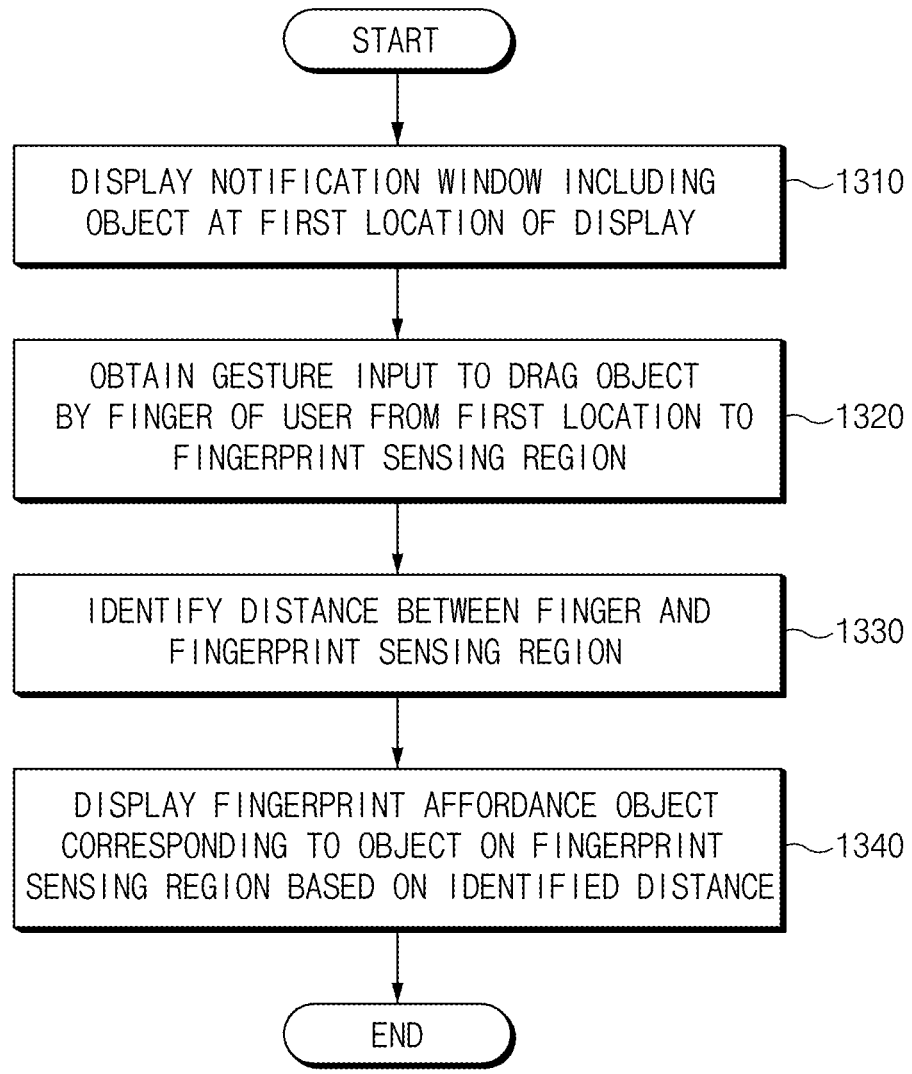
FIG. 13 is a flowchart illustrating an example fingerprint authentication interface method, according to an embodiment.

FIG. 13 is a flowchart illustrating an example fingerprint authentication interface method, according to an embodiment.

Referring to FIG. 13, in operation 1310, the processor 460 (e.g., 460 of FIG. 4) may display a notification window including a message object at a first location of the display 440 (e.g., 440 of FIG. 4).

In operation 1320, the processor 460 may obtain a gesture input to drag the message object by the user's finger from the first location to the fingerprint sensing region, through the display 440.

In operation 1330, the processor 460 may identify the distance between the finger and the fingerprint sensing region depending on the gesture input.

In operation 1340, the processor 460 may display a fingerprint affordance object to induce fingerprint authentication for the message object, in the overlapped region when the identified distance is within a specified distance.

Figure 14A:
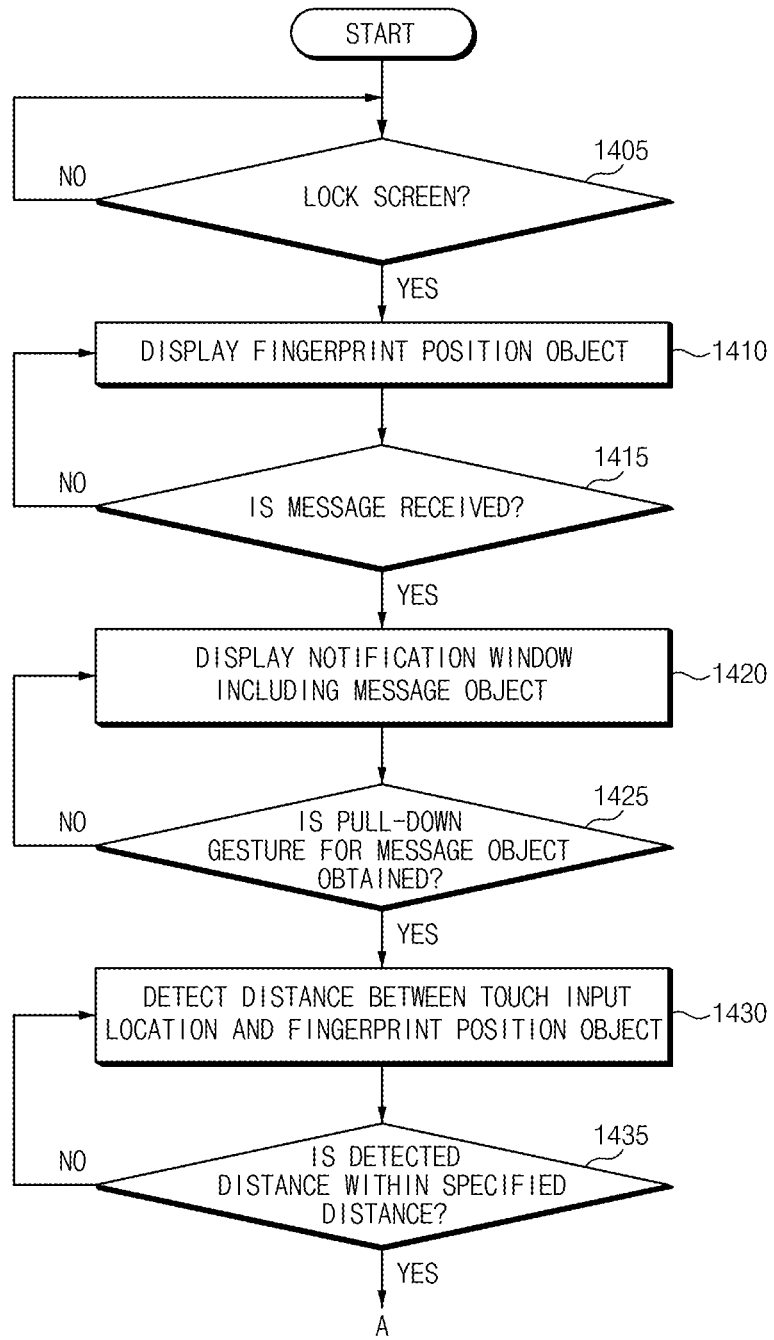
FIGS. 14A and 14B are flowcharts illustrating an example fingerprint authentication interface method, according to an embodiment.
Figure 14B:
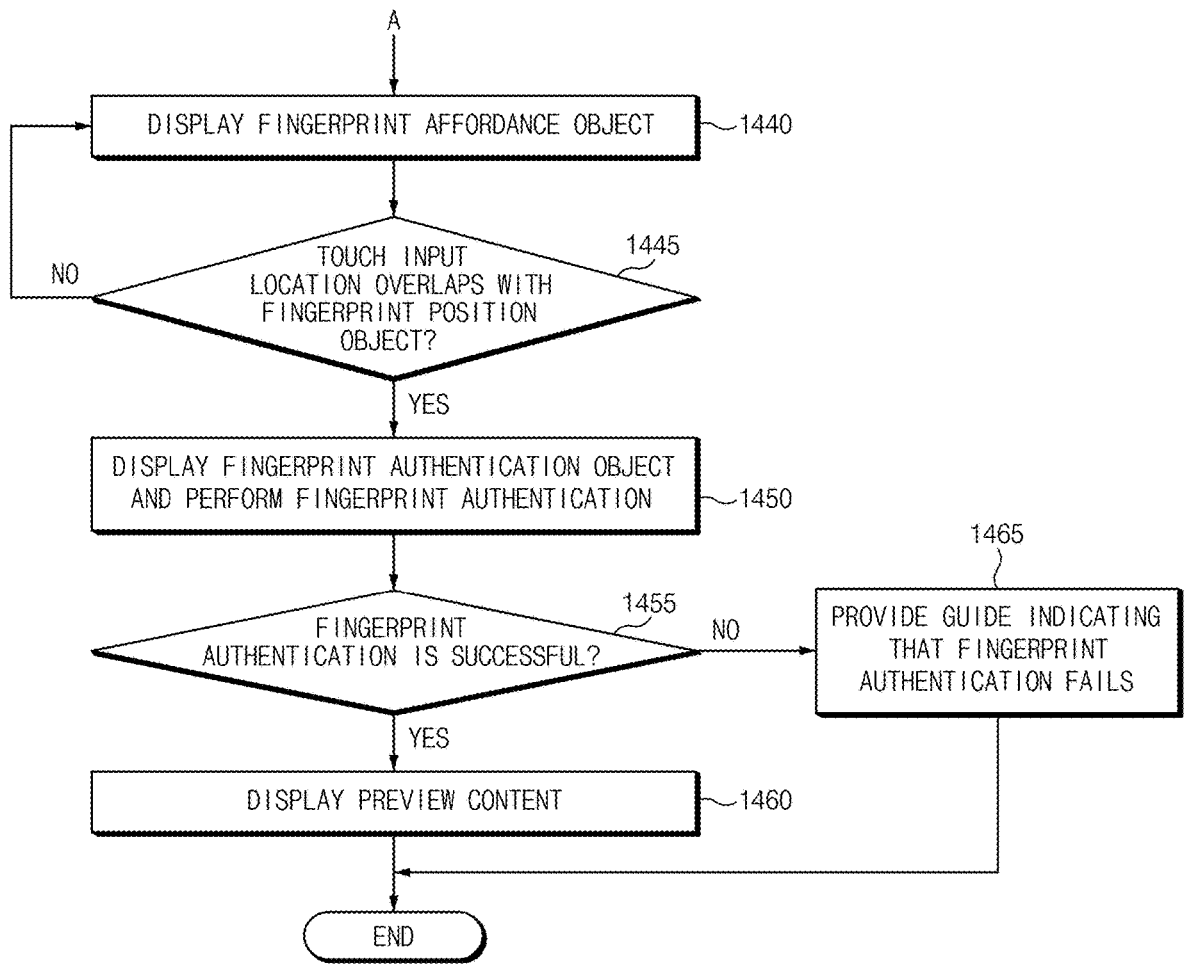

FIGS. 14A and 14B are flowcharts illustrating an example fingerprint authentication interface method, according to an embodiment.

Referring to FIG. 14A, when the electronic device 400 (e.g., 400 of FIG. 4) is in a locked state in operation 1405, the processor 460 may display a lock screen including a fingerprint position object in operation 1410. When the electronic device 400 is not in the locked state, for example, in a state where a home screen or application execution screen is displayed, the processor 460 may not display the fingerprint position object when fingerprint authentication is not required.

When there is a received message in operation 1415, in operation 1420, the processor 460 may display a notification window including an object (hereinafter, referred to as a "message object") corresponding to the received message. The processor 460 may display a lock screen including a fingerprint position object when the received message is not present in operation 1415.

When obtaining a pull-down gesture input for the message object in the notification window in operation 1425, in operation 1430, the processor 460 may detect the distance between the touch input location and the fingerprint position object. When the processor 460 does not obtain the pull-down gesture input in operation 1425, the processor 460 may display the notification window including a message object.

The processor 460 may determine whether the detected distance is within a specified distance in operation 1435. Referring to FIG. 14B, in operation 1440, the processor 460 may display the fingerprint affordance object when the detected distance is within the specified distance. When the detected distance is not less than the specified distance in operation 1435, the processor 460 may detect the distance between the touch input location and the fingerprint position object.

In operation 1445, the processor 460 may determine whether the touch input location overlaps with the fingerprint position object; in operation 1450, the processor 460 may display the fingerprint authentication object and may perform fingerprint authentication using the fingerprint sensor 410, when the touch input location overlaps with the fingerprint position object. When the touch input location does not overlap with the fingerprint position object in operation 1445, the processor 460 may continue to display the fingerprint affordance object.

When the fingerprint authentication is successful in operation 1455, in operation 1460, the processor 460 may output the preview content in the message object. When the fingerprint authentication fails in operation 1455, in operation 1465, the processor 460 may display the screen information for providing a guide indicating that the fingerprint authentication fails, on the display 440.

In operation 1405 to operation 1465, when the specified time elapses without detection of the touch input while the processor 460 displays at least one object through the display 440, the processor 460 may deactivate the display 440.

According to various embodiments of the disclosure, it is possible to improve the accessibility to the security app. Additionally, a variety of effects directly or indirectly understood through this disclosure may be provided.

Figure 15:
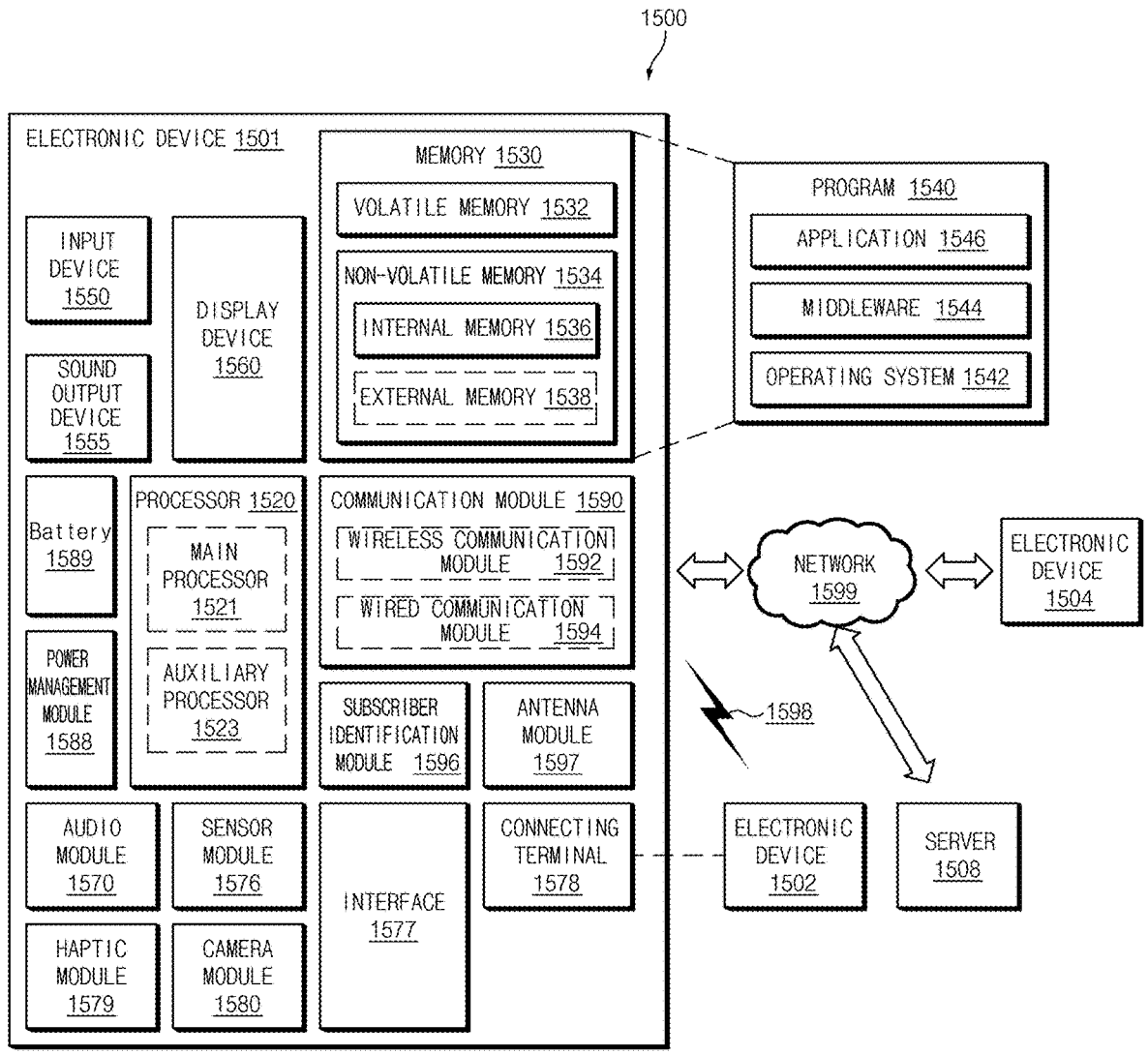
FIG. 15 is a block diagram illustrating an example electronic device in a network environment according to various embodiments.

FIG. 15 is a block diagram illustrating an electronic device 1501 in a network environment 1500 according to various embodiments. Referring to FIG. 15, the electronic device 1501 in the network environment 1500 may communicate with an electronic device 1502 via a first network 1598 (e.g., a short-range wireless communication network), or an electronic device 1504 or a server 1508 via a second network 1599 (e.g., a long-range wireless communication network). According to an embodiment, the electronic device 1501 may communicate with the electronic device 1504 via the server 1508. According to an embodiment, the electronic device 1501 may include a processor 1520, memory 1530, an input device 1550, a sound output device 1555, a display device 1560, an audio module 1570, a sensor module 1576, an interface 1577, a haptic module 1579, a camera module 1580, a power management module 1588, a battery 1589, a communication module 1590, a subscriber identification module (SIM) 1596, or an antenna module 1597. In some embodiments, at least one (e.g., the display device 1560 or the camera module 1580) of the components may be omitted from the electronic device 1501, or one or more other components may be added in the electronic device 1501. In some embodiments, some of the components may be implemented as single integrated circuitry. For example, the sensor module 1576 (e.g., a fingerprint sensor, an iris sensor, or an illuminance sensor) may be implemented as embedded in the display device 1560 (e.g., a display).

The processor 1520 may execute, for example, software (e.g., a program 1540) to control at least one other component (e.g., a hardware or software component) of the electronic device 1501 coupled with the processor 1520, and may perform various data processing or computation. According to one embodiment, as at least part of the data processing or computation, the processor 1520 may load a command or data received from another component (e.g., the sensor module 1576 or the communication module 1590) in volatile memory 1532, process the command or the data stored in the volatile memory 1532, and store resulting data in non-volatile memory 1534. According to an embodiment, the processor 1520 may include a main processor 1521 (e.g., a central processing unit (CPU) or an application processor (AP)), and an auxiliary processor 1523 (e.g., a graphics processing unit (GPU), an image signal processor (ISP), a sensor hub processor, or a communication processor (CP)) that is operable independently from, or in conjunction with, the main processor 1521. Additionally or alternatively, the auxiliary processor 1523 may be adapted to consume less power than the main processor 1521, or to be specific to a specified function. The auxiliary processor 1523 may be implemented as separate from, or as part of the main processor 1521.

The auxiliary processor 1523 may control at least some of functions or states related to at least one component (e.g., the display device 1560, the sensor module 1576, or the communication module 1590) among the components of the electronic device 1501, instead of the main processor 1521 while the main processor 1521 is in an inactive (e.g., sleep) state, or together with the main processor 1521 while the main processor 1521 is in an active state (e.g., executing an application). According to an embodiment, the auxiliary processor 1523 (e.g., an image signal processor or a communication processor) may be implemented as part of another component (e.g., the camera module 1580 or the communication module 1590) functionally related to the auxiliary processor 1523.

The memory 1530 may store various data used by at least one component (e.g., the processor 1520 or the sensor module 1576) of the electronic device 1501. The various data may include, for example, software (e.g., the program 1540) and input data or output data for a command related thereto. The memory 1530 may include the volatile memory 1532 or the non-volatile memory 1534.

The program 1540 may be stored in the memory 1530 as software, and may include, for example, an operating system (OS) 1542, middleware 1544, or an application 1546.

The input device 1550 may receive a command or data to be used by other component (e.g., the processor 1520) of the electronic device 1501, from the outside (e.g., a user) of the electronic device 1501. The input device 1550 may include, for example, a microphone, a mouse, or a keyboard.

The sound output device 1555 may output sound signals to the outside of the electronic device 1501. The sound output device 1555 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 1560 may visually provide information to the outside (e.g., a user) of the electronic device 1501. The display device 1560 may include, for example, a display, a hologram device, or a projector and control circuitry to control a corresponding one of the display, hologram device, and projector. According to an embodiment, the display device 1560 may include touch circuitry adapted to detect a touch, or sensor circuitry (e.g., a pressure sensor) adapted to measure the intensity of force incurred by the touch.

The audio module 1570 may convert a sound into an electrical signal and vice versa. According to an embodiment, the audio module 1570 may obtain the sound via the input device 1550, or output the sound via the sound output device 1555 or a headphone of an external electronic device (e.g., an electronic device 1502) directly (e.g., wiredly) or wirelessly coupled with the electronic device 1501.

The sensor module 1576 may detect an operational state (e.g., power or temperature) of the electronic device 1501 or an environmental state (e.g., a state of a user) external to the electronic device 1501, and then generate an electrical signal or data value corresponding to the detected state. According to an embodiment, the sensor module 1576 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1577 may support one or more specified protocols to be used for the electronic device 1501 to be coupled with the external electronic device (e.g., the electronic device 1502) directly (e.g., wiredly) or wirelessly. According to an embodiment, the interface 1577 may include, for example, a high definition multimedia interface (HDMI), a universal serial bus (USB) interface, a secure digital (SD) card interface, or an audio interface.

A connecting terminal 1578 may include a connector via which the electronic device 1501 may be physically connected with the external electronic device (e.g., the electronic device 1502). According to an embodiment, the connecting terminal 1578 may include, for example, a HDMI connector, a USB connector, a SD card connector, or an audio connector (e.g., a headphone connector), The haptic module 1579 may convert an electrical signal into a mechanical stimulus (e.g., a vibration or a movement) or electrical stimulus which may be recognized by a user via his tactile sensation or kinesthetic sensation. According to an embodiment, the haptic module 1579 may include, for example, a motor, a piezoelectric element, or an electric stimulator.

The camera module 1580 may capture a still image or moving images. According to an embodiment, the camera module 1580 may include one or more lenses, image sensors, image signal processors, or flashes.

The power management module 1588 may manage power supplied to the electronic device 1501. According to one embodiment, the power management module 1588 may be implemented as at least part of, for example, a power management integrated circuit (PMIC).

The battery 1589 may supply power to at least one component of the electronic device 1501. According to an embodiment, the battery 1589 may include, for example, a primary cell which is not rechargeable, a secondary cell which is rechargeable, or a fuel cell.

The communication module 1590 may support establishing a direct (e.g., wired) communication channel or a wireless communication channel between the electronic device 1501 and the external electronic device (e.g., the electronic device 1502, the electronic device 1504, or the server 1508) and performing communication via the established communication channel. The communication module 1590 may include one or more communication processors that are operable independently from the processor 1520 (e.g., the application processor (AP)) and supports a direct (e.g., wired) communication or a wireless communication. According to an embodiment, the communication module 1590 may include a wireless communication module 1592 (e.g., a cellular communication module, a short-range wireless communication module, or a global navigation satellite system (GNSS) communication module) or a wired communication module 1594 (e.g., a local area network (LAN) communication module or a power line communication (PLC) module). A corresponding one of these communication modules may communicate with the external electronic device via the first network 1598 (e.g., a short-range communication network, such as Bluetooth™, wireless-fidelity (Wi-Fi) direct, or infrared data association (IrDA)) or the second network 1599 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips)

separate from each other. The wireless communication module 1592 may identify and authenticate the electronic device 1501 in a communication network, such as the first network 1598 or the second network 1599, using subscriber information (e.g., international mobile subscriber identity (IMSI)) stored in the subscriber identification module 1596.

The antenna module 1597 may transmit or receive a signal or power to or from the outside (e.g., the external electronic device) of the electronic device 1501. According to an embodiment, the antenna module 1597 may include one or more antennas, and, therefrom, at least one antenna appropriate for a communication scheme used in the communication network, such as the first network 1598 or the second network 1599, may be selected, for example, by the communication module 1590 (e.g., the wireless communication module 1592). The signal or the power may then be transmitted or received between the communication module 1590 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1501 and the external electronic device 1504 via the server 1508 coupled with the second network 1599. Each of the electronic devices 1502 and 1504 may be a device of a same type as, or a different type, from the electronic device 1501. According to an embodiment, all or some of operations to be executed at the electronic device 1501 may be executed at one or more of the external electronic devices 1502, 1504, or 1508. For example, if the electronic device 1501 should perform a function or a service automatically, or in response to a request from a user or another device, the electronic device 1501, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1501. The electronic device 1501 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1540) including one or more instructions that are stored in a storage medium (e.g., internal memory 1536 or external memory 1538) that is readable by a machine (e.g., the electronic device 1501). For example, a processor (e.g., the processor 1520) of the machine (e.g., the electronic device 1501) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, an electronic device (e.g., 400 of FIG. 4) includes a housing including a front plate (e.g., 100A of FIG. 2) and a rear plate facing a direction opposite to the front plate (e.g., 100B of FIG. 2); a touch screen display (e.g., 440 of FIG. 4) exposed through a part of the front plate; a fingerprint sensor (e.g., 410 of FIG. 4) interposed between the display and the rear plate and disposed to overlap with a region of the display when viewed from above the front plate; a processor (e.g., 460 of FIG. 4) operatively connected to the display and the fingerprint sensor; and a memory (e.g., 450 of FIG. 4) operatively connected to the processor, wherein the memory stores instructions that, when executed, cause the processor to display a user interface including a first object at a first location of the display; obtain a gesture input to drag the first object by a finger of a user from the first location to the region, through the display; move the first object to the region depending on the gesture input; and when the finger is located on the region, perform authentication using the fingerprint sensor.

Wherein the instructions further cause the processor to when the authentication is successful, display at least one content associated with the first object or at least another object adjacent to the first object.

Wherein the instructions further cause the processor to when the authentication is successful, expand the first object; and display preview content corresponding to the first object in the expanded first object.

Wherein the first object is a notification associated with an event, which is generated or received by the electronic device.

Wherein the user interface is a lock screen.

Wherein the first object includes a notification bar or a page.

Wherein the notification is associated with a message or an e-mail, and wherein the content includes a text of the message or the e-mail.

Wherein the instructions further cause the processor to when a specific time elapses after the gesture input is released, move the first object to the first location again.

Wherein the fingerprint sensor includes an ultrasonic fingerprint sensor or an optical fingerprint sensor.

According to an embodiment, an electronic device (e.g., 400 of FIG. 4) includes a housing including a front plate (e.g., 100A of FIG. 2) and a rear plate (e.g., 100B of FIG. 2) facing a direction opposite to the front plate; a touch screen display (e.g., 440 of FIG. 4) exposed through a part of the front plate; a fingerprint sensor (e.g., 410 of FIG. 4) interposed between the display and the rear plate and overlapping with a fingerprint sensing region of the display when viewed from above the front plate; a processor (e.g., 460 of FIG. 4) operatively connected to the display and the fingerprint sensor; and a memory (e.g., 450 of FIG. 4) operatively connected to the processor, wherein the memory stores instructions that, when executed, cause the processor to display a notification window including a first object at a first location of the display; obtain a gesture input to drag the first object by a finger of a user from the first location to the fingerprint sensing region, through the display; identify a distance between the finger and the fingerprint sensing region depending on the gesture input; and when the identified distance is within a specified distance, display a second object for inducing fingerprint authentication for the first object, in the fingerprint sensing region.

Wherein the notification window is a notification window displayed on a lock screen of the electronic device.

Wherein the instructions further cause the processor to when the identified distance is within the specified distance, display the second object and activate the fingerprint sensor.

Wherein the instructions further cause the processor to when the finger is positioned in the fingerprint sensing region, perform fingerprint authentication; and display a third object indicating that the fingerprint authentication is in progress.

Wherein the third object is displayed in an area wider than the second object.

Wherein the instructions further cause the processor to display a brightness value of the third object to be a specified brightness value or more.

Wherein the instructions further cause the processor to when the authentication is successful, expand the first object; and display preview content corresponding to the first object in the expanded first object.

Wherein the instructions further cause the processor to analyze contextual content of the first object; and generate the preview content corresponding to the analyzed contextual content, through an application corresponding to the first object.

The electronic device further includes a speech recognition circuit (e.g., 430 of FIG. 4) interposed between the display and the rear plate; and a pressure sensor (e.g., 420 of FIG. 4) interposed between the display and the rear plate and overlapping with the fingerprint sensing region when viewed from above the front plate, wherein the instructions further cause the processor to in a situation where the preview content is displayed, when detecting a pressure of specified intensity or more through the pressure sensor, activate the speech recognition circuit; recognize a speech recognition instruction through the speech recognition circuit based on a speech recognition technology; execute the speech recognition instruction through an application corresponding to the first object; and display an execution result of the speech recognition instruction in the first object.

According to an embodiment, a fingerprint authentication interface method, the method includes displaying a notification window including a first object at a first location of a display; receiving a gesture input to drag the first object by a finger of a user from the first location to a fingerprint sensing region, through the display; identifying a distance between the finger and the fingerprint sensing region depending on the gesture input; and when the identified distance is within a specified distance, displaying a second object for inducing fingerprint authentication for the first object, in the fingerprint sensing region.

The method further includes when the identified distance is within the specified distance, displaying the second object and activating the fingerprint sensor.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments thereof, it will be understood by those skilled in the art that various changes in form and details may be made therein without departing from the spirit and scope of the disclosure as defined, for example, by the appended claims and their equivalents.

What is claimed is:

1. An electronic device comprising:
a housing including a front plate facing a first direction and a rear plate facing a direction opposite the first direction;
a touch screen display viewable through a part of the front plate;
a fingerprint sensor interposed between the display and the rear plate and overlapping a fingerprint sensing region of the display when viewed from above the front plate;
a processor operatively connected to the display and the fingerprint sensor; and
a memory operatively connected to the processor,
wherein the memory stores instructions that, when executed by the processor, control the electronic device to:
display a notification window including a first object at a first location of the display, wherein the first object is a first notification object located in the notification window which is displayed on a lock screen of the electronic device;
obtain a gesture input to drag the first notification object from the first location to the fingerprint sensing region;
identify a distance between a finger and the fingerprint sensing region based on the gesture input;
display a second object for inducing fingerprint authentication for the first object in the fingerprint sensing region based on the identified distance being within a specified distance;
perform fingerprint authentication based on a finger being positioned in the fingerprint sensing region, and display a third object indicating that the fingerprint authentication is in progress, wherein the third object is displayed in an area wider than the second object; and
display preview content of the first notification object on the lock screen when authentication performed on the fingerprint sensing region is successful.

2. The electronic device of claim 1, wherein the instructions, when executed by the processor, further control the electronic device to:
display the second object and activate the fingerprint sensor based on the identified distance being within the specified distance.

3. The electronic device of claim 1, wherein the instructions, when executed by the processor, further control the electronic device to:
display a brightness value of the third object to be a specified brightness value or more.

4. The electronic device of claim 1, wherein the instructions, when executed by the processor, further control the electronic device to:
expand the first object based on the authentication being successful; and
display the preview content in the expanded first object.

5. The electronic device of claim 4, wherein the instructions, when executed by the processor, further control the electronic device to:
analyze contextual content of the first object; and
generate the preview content corresponding to the analyzed contextual content through an application corresponding to the first object.

6. The electronic device of claim 4, further comprising:
a speech recognition circuit interposed between the display and the rear plate; and
a pressure sensor interposed between the display and the rear plate and overlapping the fingerprint sensing region when viewed from above the front plate,
wherein the instructions, when executed by the processor, further control the electronic device to:
based on the preview content being displayed, activate the speech recognition circuit based on detecting a pressure of specified intensity or more through the pressure sensor;
recognize a speech recognition instruction through the speech recognition circuit based on a speech recognition technology;
execute the speech recognition instruction through an application corresponding to the first object; and
display an execution result of the speech recognition instruction in the first object.

7. A fingerprint authentication interface method, the method comprising:
displaying a notification window on a lock screen of the electronic device, wherein the notification window includes a first object at a first location of a display;
receiving a gesture input to drag the first object from the first location to a fingerprint sensing region;
identifying a distance between a finger and the fingerprint sensing region depending on the gesture input;
displaying a second object for inducing fingerprint authentication for the first object in the fingerprint sensing region based on the identified distance being within a specified distance;
performing fingerprint authentication based on a finger being positioned in the fingerprint sensing region, and displaying a third object indicating that the fingerprint authentication is in progress, wherein the third object is displayed in an area wider than the second object; and
displaying preview content of the first notification object on the lock screen when an authentication performed on the fingerprint sensing region is successful.

8. The method of claim 7, further comprising: displaying the second object and activating the fingerprint sensor based on the identified distance being within the specified distance.

* * * * *